(12) United States Patent
Wakamatsu

(10) Patent No.: US 8,290,531 B2
(45) Date of Patent: Oct. 16, 2012

(54) POWER TRANSMITTING APPARATUS, POWER TRANSMISSION METHOD, PROGRAM, AND POWER TRANSMISSION SYSTEM

(75) Inventor: Masataka Wakamatsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 637 days.

(21) Appl. No.: 12/430,506

(22) Filed: Apr. 27, 2009

(65) Prior Publication Data

US 2009/0271048 A1 Oct. 29, 2009

(30) Foreign Application Priority Data

Apr. 28, 2008 (JP) ................. P2008-117303

(51) Int. Cl.
*H04B 7/00* (2006.01)
(52) U.S. Cl. ..................... 455/522; 455/41.1
(58) Field of Classification Search ............... 455/522, 455/41.1
See application file for complete search history.

(56) References Cited

U.S. PATENT DOCUMENTS

| 7,541,930 | B2 * | 6/2009 | Saarisalo et al. ........... 340/572.7 |
|---|---|---|---|
| 7,956,495 | B2 * | 6/2011 | Jin ................... 307/104 |
| 2008/0014897 | A1 | 1/2008 | Cook et al. |
| 2009/0096291 | A1 * | 4/2009 | Gainville et al. .............. 307/41 |

FOREIGN PATENT DOCUMENTS

| JP | 2003-143712 | 5/2003 |
|---|---|---|
| JP | 2009-524399 | 6/2009 |
| WO | WO 2007/026888 A1 | 3/2007 |
| WO | WO 2007/084717 A | 7/2007 |

OTHER PUBLICATIONS

Marin Soljacic, et al., "Develop technique of wirelessly transmitting power, light a 60W light bulb in the experiment" Nikkei Business Publications 12-3, pp. 117-128 (2007).

* cited by examiner

*Primary Examiner* — James H Cho
(74) *Attorney, Agent, or Firm* — Finnegan, Henderson, Farabow, Garrett & Dunner, L.L.P.

(57) ABSTRACT

There is provided a power transmitting apparatus including a power transmission side communication unit for communicating with one or more power receiving apparatus for receiving transmitted power; a power transmission unit for transmitting power to the one or more power receiving apparatus in a non-contact manner; an allocating unit for dividing transmission of power from the power transmission unit to the power receiving apparatus to a plurality of dividing periods for every predetermined period, and allocating the one or more power receiving apparatus to one of the dividing periods; and a power transmission control unit for selectively transmitting power to the one or more power receiving apparatus for every dividing period based on the allocation result in the allocating unit.

19 Claims, 17 Drawing Sheets

FIG.6

| SLOT NUMBER i | 0 | 1 | 2 | 3 | 4 | 5 | ... | 63 |
|---|---|---|---|---|---|---|---|---|
| Status Si | 2 | 0 | 2 | 3 | 2 | 1 | | 0 |
| COUPLING COEFFICIENT $\kappa_i$ | 0.5 | - | 0.5 | - | 0.5 | 0.2 | | - |
| TOTAL POWER TRANSMISSION REQUEST Di (W) | 4 | - | 4 | - | 4 | 1 | | - |
| POWER TRANSMISSION AMOUNT Psi (W) | 8 | 0 | 8 | 0 | 8 | 5 | | 0 |
| CONVERTED POWER TRANSMISSION MARGIN Ri (W) | 6 | 0 | 6 | 0 | 6 | 3 | | 0 |
| ALLOCATION BMPi | 0001 | 0000 | 0001 | 0000 | 0001 | 0010 | | 0000 |

POWER TRANSMITTING APPARATUS, POWER TRANSMISSION METHOD, PROGRAM, AND POWER TRANSMISSION SYSTEM

BACKGROUND OF THE INVENTION

1. Field of the Invention

The present invention relates to a power transmitting apparatus, a power transmission method, a program, and a power transmission system.

2. Description of the Related Art

In recent years, the power transmission system capable of transmitting power between devices in a non-contact manner is being widely used. Such power transmission system includes an IC card system using a reader/writer (one example of power transmitting apparatus) and an IC card (one example of power receiving apparatus) such as electronic money system, ticket system of transportation means, and admission system using employee ID card.

A technique of transmitting power of larger capacity to a farther distance is being developed. The technique of transmitting power using electric field or magnetic field resonance is described, for example, in Marin Soljacic, Aristeidis Karalis, John Joannopoulos, Andre Kurs, Robert Moffatt, Peter Fisher, "Develop technique of wirelessly transmitting power, light a 60 W light bulb in the experiment" Nikkei Business Publications 12-3, 2007, pp. 117-128.

SUMMARY OF THE INVENTION

In the power transmission system of transmitting power in a non-contact manner, as transmission of power of larger capacity to a power receiving apparatus of farther distance becomes possible, the power transmitting apparatus can more easily transmit power to a plurality of power receiving apparatuses.

However, there is a limit to the power the power transmitting apparatus can transmit in a certain predetermined period. Thus, as the power transmitting apparatus can more easily transmit power to a plurality of power receiving apparatuses, the possibility the power transmitting apparatus may not transmit the power desired by the power receiving apparatus increases. If the power transmitting apparatus may not transmit the power desired by the power receiving apparatus, for instance, various drawbacks to an extent the power receiving apparatus may not obtain the power necessary for operation may arise. The possibility various drawbacks occur in the power receiving apparatus becomes higher the more the power of larger capacity can be transmitted to farther distance.

The present invention addresses the above-identified, and other issues associated with methods in related art and apparatuses, and it is desirable to provide a new and improved power transmitting apparatus capable of stably transmitting power to one or more power receiving apparatus, a power transmission method, a program, and a power transmission system.

According to an embodiment of the present invention, there is provided a power transmitting apparatus including a power transmission side communication unit for communicating with one or more power receiving apparatus for receiving transmitted power; a power transmission unit for transmitting power to the one or more power receiving apparatus in a non-contact manner; an allocating unit for dividing transmission of power from the power transmission unit to the power receiving apparatus to a plurality of dividing periods for every predetermined period, and allocating the one or more power receiving apparatus to one of the dividing periods; and a power transmission control unit for selectively transmitting power to the one or more power receiving apparatus for every dividing period based on the allocation result in the allocating unit.

According to such configuration, power can be stably transmitted to one or more power receiving apparatus.

The allocating unit may allocate the power receiving apparatus to the dividing period based on a power transmission request desiring for power transmission transmitted from each power receiving apparatus received by the power transmission side communication unit.

A transmission power information deriving unit for increasing discretely a first transmission power to transmit from the power transmission unit to the power receiving apparatus, which transmitted the power transmission request, and deriving, for every power receiving apparatus, information related to power transmission defining a state related to transmission of power with the power receiving apparatus based on reception at the power transmission side communication unit of received power information transmitted from the power receiving apparatus, indicating that a received power level meet a predetermined level is further arranged, wherein the allocating unit can allocate the power receiving apparatus to the dividing period based on information related to power transmission for every power receiving apparatus derived by the transmission power information deriving unit.

The transmission power information deriving unit may derive a coupling coefficient with the power receiving apparatus as information related to power transmission.

The allocating unit may allocate the power receiving apparatus, which value of the coupling coefficient is within a predetermined range, to the same dividing period.

The allocating unit may allocate the power receiving apparatus to the dividing period based on a total power transmission amount transmittable for every dividing period, and a requesting power transmission amount which transmission is requested by the power receiving apparatus.

The power transmission request may further include drive information indicating whether or not to directly use the received power, and the allocating unit may allocate the power receiving apparatus in the dividing period further based on the drive information.

The power transmission side communication unit may transmit power transmission request accepting information requesting for transmission of the power transmission request in one of the dividing periods within the predetermined period.

The power transmission side communication unit may transmit information of the allocation result in the allocating unit to the one or more power receiving apparatus.

According to the embodiment of the present invention described above, there is provided a power transmission method including the steps of: transmitting power transmission request accepting information requesting for transmission of a power transmission request desiring for power transmission to one or more power receiving apparatus; receiving the power transmission request transmitted from the power receiving apparatus in response to the power transmission request accepting information; dividing the transmission of power to a plurality of dividing periods for every predetermined period, and allocating the power receiving apparatus to one of the dividing periods based on the power transmission request received in the receiving step; and selectively transmitting power to the one or more power receiving apparatus for every dividing period based on the allocation result in the allocating step.

Through the use of such method, power can be stably transmitted to one or more power receiving apparatus.

According to the embodiments of the present invention described above, there is provided a program for causing a computer to execute the steps of: transmitting power transmission request accepting information requesting for transmission of a power transmission request desiring for power transmission to one or more power receiving apparatus; receiving the power transmission request transmitted from the power receiving apparatus in response to the power transmission request accepting information; dividing the transmission of power to a plurality of dividing periods for every predetermined period, and allocating the power receiving apparatus to one of the dividing periods based on the power transmission request received in the receiving step; and selectively transmitting power to the one or more power receiving apparatus for every dividing period based on the allocation result in the allocating step.

According to such program, power can be stably transmitted to one or more power receiving apparatus.

According to the embodiments of the present invention described above, there is provided a power transmission system including a power transmitting apparatus for transmitting power; and one or more power receiving apparatus for receiving power transmitted by the power transmitting apparatus, wherein the power transmitting apparatus includes a power transmission side communication unit for communicating with the power receiving apparatus, a power transmission unit for transmitting power to the one or more power receiving apparatus in a non-contact manner, an allocating unit for dividing transmission of power from the power transmission unit to the power receiving apparatus to a plurality of dividing periods for every predetermined period, and allocating the power receiving apparatus to the dividing period based on a power transmission request desiring for power transmission transmitted from each power receiving apparatus received by the power transmission side communication unit, and a power transmission control unit for selectively transmitting power to the one or more power receiving apparatus for every dividing period based on the allocation result in the allocating unit; and the power receiving apparatus includes a power receiving side communication unit for communicating with the power transmitting apparatus, a power reception unit for receiving power transmitted from the power transmitting apparatus in a non-contact manner, and a control unit for transmitting the power transmission request to the power transmitting apparatus via the power receiving side communication unit.

According to such configuration, a power transmission system in which power can be stably transmitted to one or more power receiving apparatus is realized.

According to the embodiments of the present invention described above, power can be stably transmitted to one or more power receiving apparatus.

BRIEF DESCRIPTION OF THE DRAWINGS

FIG. 6 is an explanatory view showing one example of a power transmission table according to the embodiment of the present invention.

DETAILED DESCRIPTION OF THE PREFERRED EMBODIMENTS

Figure 1:
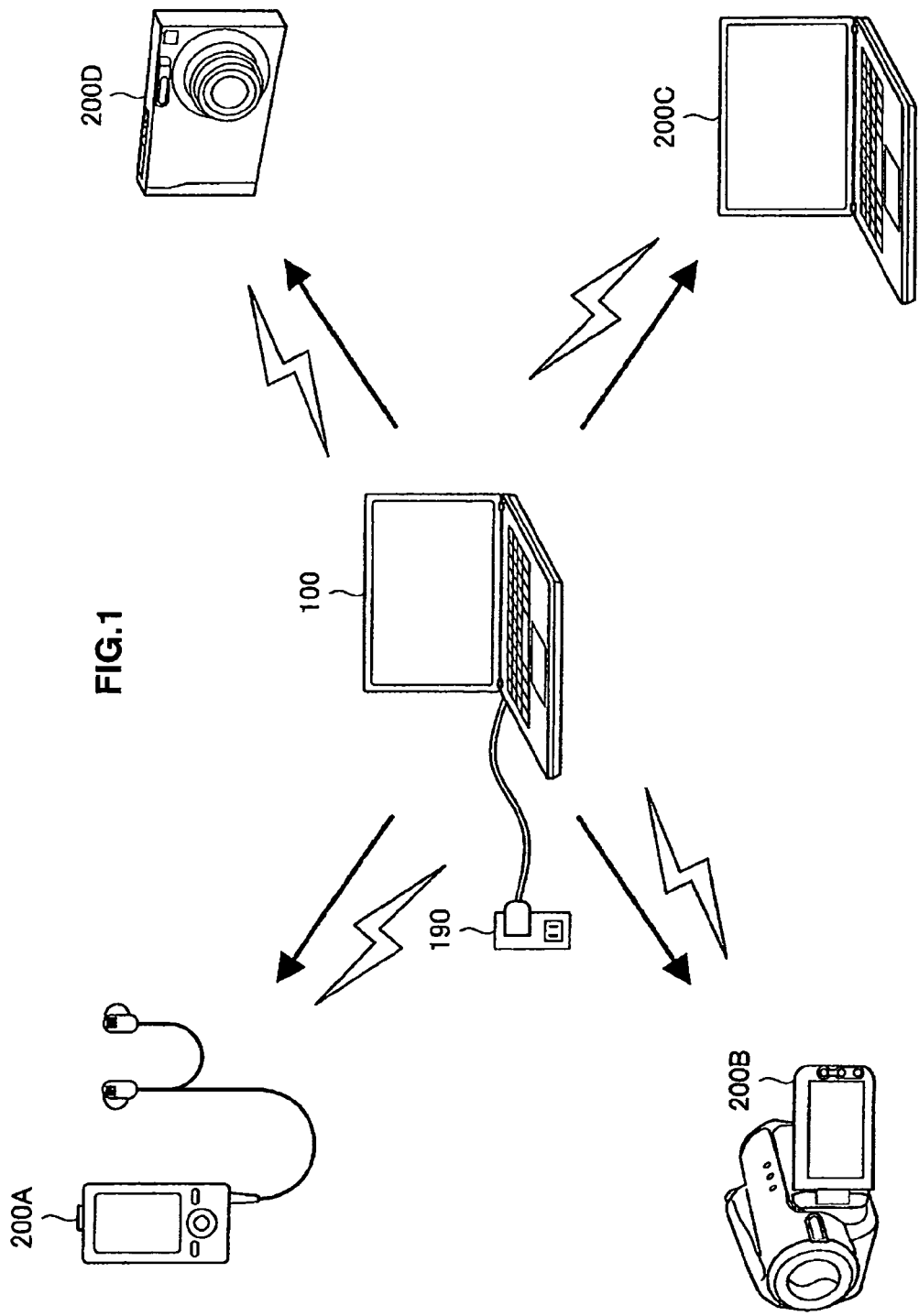
FIG. 1 is an explanatory view showing an outline of a power transmission system according to an embodiment of the present invention.

Hereafter, preferred embodiments of the present invention will be described in detail with reference to the appended drawings. Note that in this specification and the appended drawings, structural elements that have substantially the same functions and structures are denoted with the same reference numerals and a repeated explanation of these structural elements is omitted.

Power Transmission System According to Embodiment of the Present Invention

FIG. 1 is an explanatory view showing an outline of a power transmission system 1000 according to an embodiment of the present invention. With reference to FIG. 1, the power transmission system 1000 includes a power transmitting apparatus 100 for transmitting power, and power receiving apparatuses 200A, 200B, 200C, and 200D for receiving the power transmitted by the power transmitting apparatus 100 in a non-contact manner (wirelessly). In FIG. 1, an example where the power transmitting apparatus 100 is externally transmitted with power through an outlet 190 is shown, but this is not the only case. The power receiving apparatuses 200A, 200B, 200C, and 200D are hereinafter sometimes collectively referred to as "power receiving apparatus 200". It should be noted that the number of power receiving apparatus 200 configuring the power transmission system according to the embodiment of the present invention is not limited to four.

As shown in FIG. 1, in the power transmission system 1000, power can be transmitted in a non-contact manner to one or more power receiving apparatuses. There is a limit (upper limit) to the power the power transmitting apparatus 100 can transmit in a predetermined period (hereinafter referred to as "power transmission frame"). Thus, when the power transmitting apparatus 100 transmits power to the power receiving apparatuses 200A, 200B, 200C, and 200D in a certain power transmission frame, the total amount of power desired by each power receiving apparatus at a certain time point may exceed the power the power transmitting apparatus 100 can transmit. In this case, various drawbacks such as the power receiving apparatuses 200A, 200B, 200C, and 200D (or any one of the power receiving apparatuses) may not obtain the power necessary for operation may arise.

In the power transmission system 1000, the power transmission approaches as described in (1) and (2) below are taken to prevent such issues from arising.

[Power Transmission Approach According to the Embodiment of the Present Invention]

(1) Setting of Dividing Period and Allocation of Power Receiving Apparatus to Each Dividing Period The power transmitting apparatus 100 divides each power transmission frame to a plurality of dividing periods (hereinafter referred to as "power transmission slot"). The power transmitting apparatus 100 allocates the power receiving apparatus 200 to transmit power to for every power transmission slot. The power transmitting apparatus 100 then transmits to the power receiving apparatus 200 the allocation information indicating which power receiving apparatus 200 is allocated to which power transmission slot. The power transmitting apparatus 100 can transmit, in a dispersed manner, the power desired by each power receiving apparatus 200 within one power transmission frame by dividing the power transmission frame to a plurality of power transmission slots, and allocating the power receiving apparatus 200 for every power transmission slot.

(1-1) First Allocation Example

Figure 2:
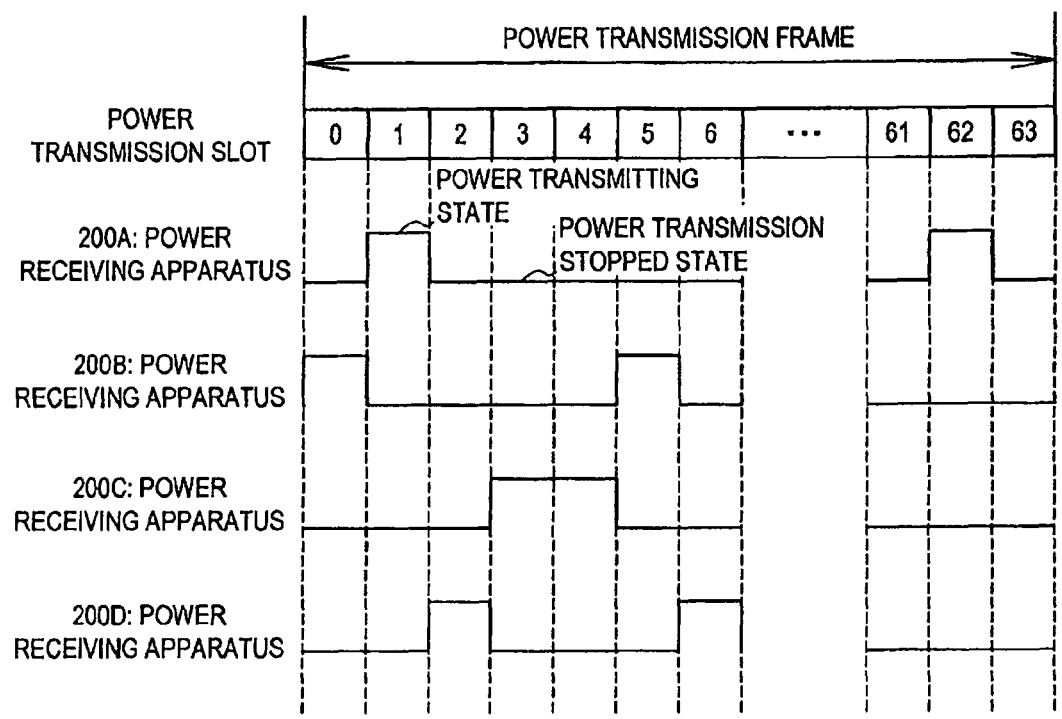
FIG. 2 is an explanatory view showing a first example of allocation to the power transmission slot (dividing period) in the power transmitting apparatus according to the embodiment of the present invention.

FIG. 2 is an explanatory view showing a first example of allocation to the power transmission slot (dividing period) in the power transmitting apparatus 100 according to the embodiment of the present invention. FIG. 2 shows an example where one power transmission frame is divided into 64 power transmission slots is shown, but the number of power transmission slots is not limited thereto. One power transmission frame is shown in FIG. 2, but is not limited thereto. For example, the power transmission frame according to the embodiment of the present invention may be continuously repeatable or may be discontinuous.

In the first allocation example, it can be recognized that the power transmitting apparatus 100 allocates one power receiving apparatus 200 to one divided slot with reference to FIG. 2. As shown in FIG. 2, the possibility various drawbacks such as each power receiving apparatus 200 may not obtain the power necessary for operation lowers by having the power transmitting apparatus 100 allocate one power receiving apparatus to one divided slot.

The power transmitting apparatus 100 performs the allocation process to the power transmission slot based on the communication result between the power transmitting apparatus 100 and each power receiving apparatus 200. More specifically, the power transmitting apparatus 100 transmits power transmission request accepting information to each power receiving apparatus 200, and allocates to the power transmission slot based on the power transmission request transmitted from each power receiving apparatus 200 in response to the power transmission request accepting information. The power transmission request is the information, to be transmitted to the power transmitting apparatus 100, on whether the power receiving apparatus 200 desires power transmission (desires to receive power). The power transmission request includes power transmission slot number information indicating the number of power transmission slots desiring power transmission, information of requesting power transmission amount indicating the desired power, drive information indicating whether the received power is directly used for driving, information combining the above, or the like, but is not limited thereto. The power transmission request accepting information is the information requesting for transmission of the power transmission request to each power receiving apparatus 200.

Figure 3:
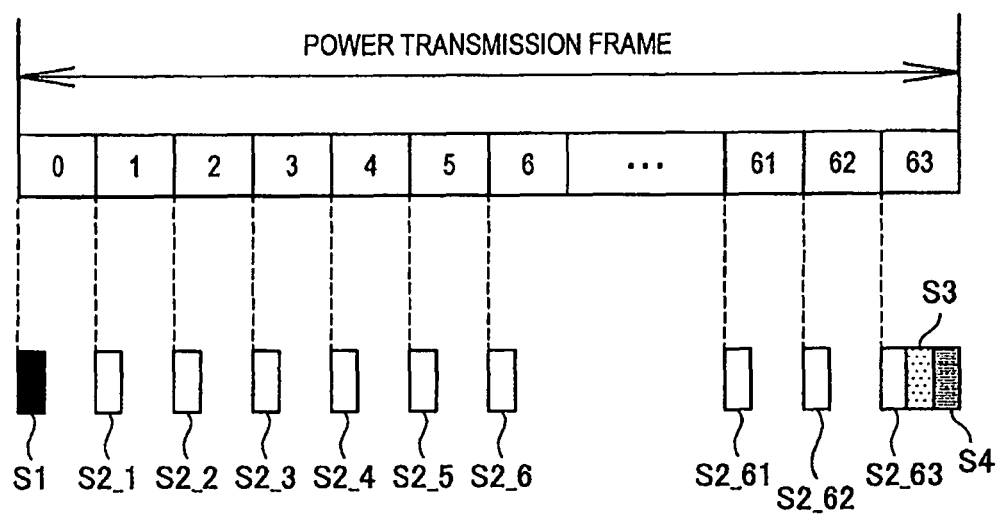
FIG. 3 is an explanatory view showing an information transmission example in the power transmitting apparatus according to the embodiment of the present invention.

FIG. 3 is an explanatory view showing an information transmission example in the power transmitting apparatus 100 according to the embodiment of the present invention. FIG. 3 shows an example where the power transmitting apparatus 100 transmits various information in correspondence to the power transmission frame. With reference to FIG. 3, the power transmitting apparatus 100 transmits a power transmission frame synchronization signal S1, power transmission slot synchronization signals S2_1 to S2_63, allocation information S3, and power transmission request accepting information S4.

The power transmission frame synchronization signal S1 is the information for transmitting the starting position of the power transmission frame to the power receiving apparatus 200, and synchronizing the power transmitting apparatus 100 and the power receiving apparatus 200. The power transmission frame synchronization signal S1 can include information indicating the start of the power transmission frame, and information such as unique power transmission frame number. The power transmission slot synchronization signals S2_1 to S2_63 are information for transmitting the starting position of each power transmission slot to the power receiving apparatus 200 and synchronizing the power transmitting apparatus 100 and the power receiving apparatus 200. The power transmission slot synchronization signals S2_1 to S2_63 can include information indicating the start of the power transmission slot, and information such as unique power transmission slot number. The power transmission frame synchronization signal S1 also serves as a power transmission slot synchronization signal corresponding to the power transmission slot 0.

The allocation information S3 is the information (information of allocation result) indicating the allocation to each power transmission slot in the next power transmission frame. The allocation information S3 can include information in which the number of power transmission slot and the power receiving apparatus information (e.g., MAC address (Media Access Control address)) for specifying the power receiving apparatus are corresponded for every power transmission slot, and information related to transmission of power (e.g., information on frequency for transmitting power, etc.). When receiving the allocation information S3, the power receiving apparatus 200 can recognize to which power transmission slot in the next power transmission frame the power is being transmitted, to which power transmission slot the power is not transmitted, and the like. The power transmission request accepting information S4 is the information requesting for transmission of the power transmission request corresponding to the next power transmission frame with respect to the power receiving apparatus 200. Since each power receiving apparatus 200 transmits the power transmission request in response to the reception of the power transmission request accepting information S4, the power transmitting apparatus 100 can acquire the transmission of the power transmission request corresponding to the next power transmission frame in a time period after transmitting the power transmission request accepting information S4. Therefore, the power transmitting apparatus 100 can efficiently perform the allocation process by performing the allocation process after transmitting the power transmission request accepting information S4.

For instance, as shown in FIG. 3, the power transmitting apparatus 100 can efficiently perform transmission of power and allocation to power transmission slot by transmitting various information in correspondence to the power transmission frame. It should be recognized that the transmission of information in the power transmitting apparatus 100 according to the embodiment of the present invention is not limited to FIG. 3. The power transmitting apparatus 100 may transmit the power transmission request accepting information S4 at an arbitrary position in the power transmission frame.

The power transmitting apparatus 100 related to the first allocation example allocates one power receiving apparatus 200 to one power transmission slot based on the power transmission request transmitted from each power receiving apparatus 200 in response to the power transmission request accepting information S4.

[Example of Allocation Process]

(1-1-A) First Example of Allocation Process

The power transmitting apparatus 100 may perform allocation to the power transmission slot based on the power transmission slot number information contained in the power transmission request. If a plurality of power receiving apparatuses 200 makes a request for power transmission in the same power transmission slot, the power transmitting apparatus 100 allocates the power receiving apparatus 200 from which the power transmission request is first received to the power transmission slot indicated by the power transmission slot number information, and allocates the other power receiving apparatuses 200 to the other power transmission slots. The allocation process according to the first example is not limited thereto, and the power transmitting apparatus 100 may perform allocation to the power transmission slot based on the priority of the power receiving apparatus defined in advance.

When allocating the power receiving apparatus 200 to the power transmission slot, the power transmitting apparatus 100 determines whether or not power can be stably transmitted to the power receiving apparatus 200 that transmitted the power transmission request based on the information of the requesting power transmission amount indicating the desired power contained in the power transmission request. The state related to the transmission of power between the power transmitting apparatus 100 and the power receiving apparatus 200 may not be constant when transmitting power in a non-contact manner. The state related to transmission of power can change by the relationship of the direction of the power transmitting antenna of the power transmitting apparatus and the direction of the power receiving antenna of the power receiving apparatus, and whether or not an obstacle is present between the power transmitting apparatus and the power receiving apparatus. If the state related to the transmission of power is not constant, various drawbacks may arise in the power receiving apparatus 200 even if the power transmitting apparatus 100 transmits the power corresponding to the requesting power transmission amount requested by the power receiving apparatus 200. Such drawbacks that may occur may be that the power receiving apparatus 200 may not obtain the power necessary for operation from the power transmitting apparatus, or that the power receiving apparatus 200 receives the power overly exceeding the power necessary for the power receiving apparatus 200 to operate.

The power transmitting apparatus 100 derives the information related to power transmission to understand the state related to transmission of power between the power transmitting apparatus 100 and the power receiving apparatus 200. The information related to power transmission is the information defining the state related to transmission of power between the power transmitting apparatus 100 and the power receiving apparatus 200. The information related to transmission of power includes a coupling coefficient $\kappa$ between the power transmitting apparatus 100 and the power receiving apparatus 200, but is not limited thereto. An example where the power transmitting apparatus 100 derives the coupling coefficient $\kappa$ as the information related to transmission of power will be described below by way of example.

<Method for Deriving Information Related to Power Transmission>

Figure 4:
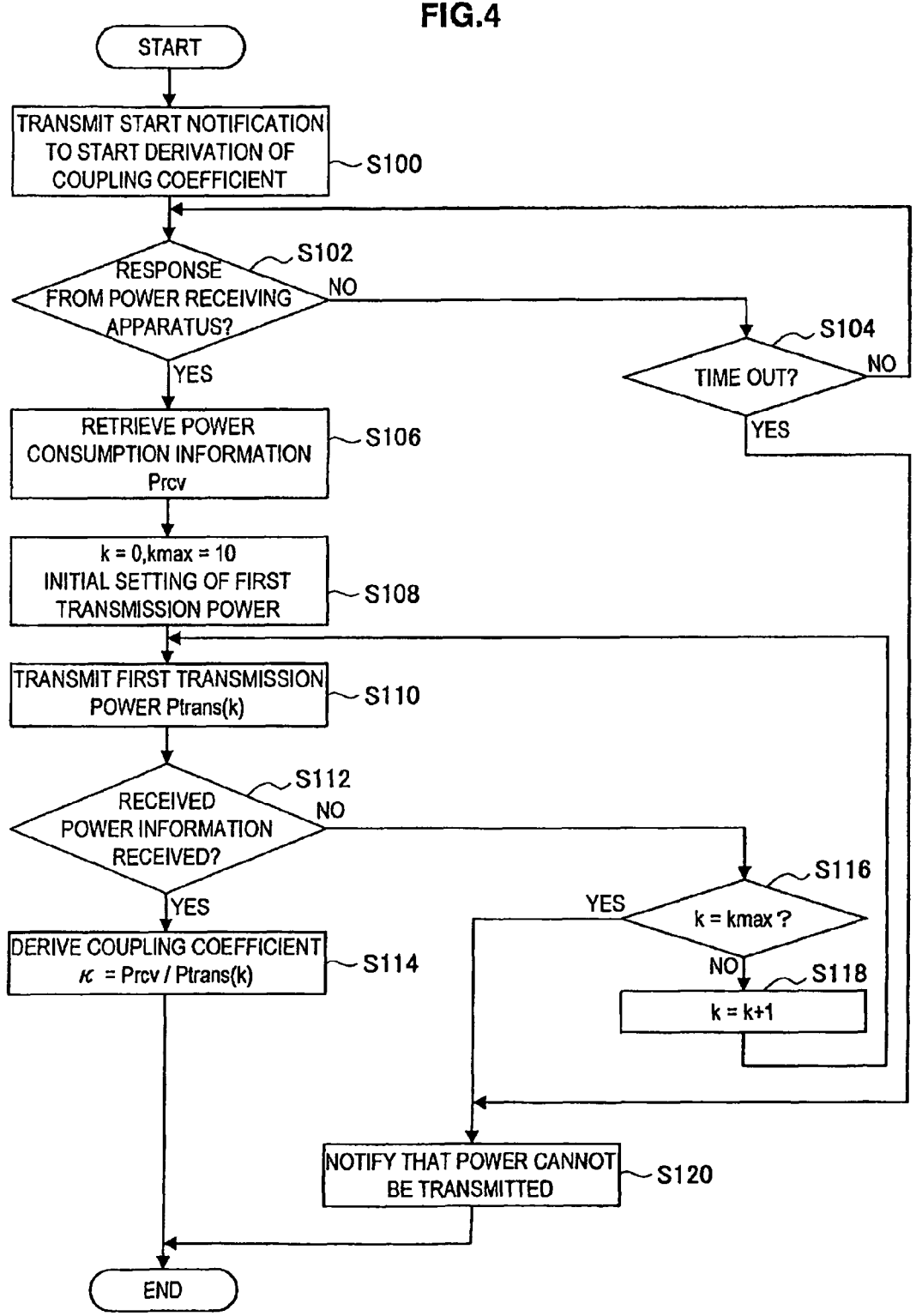
FIG. 4 is an explanatory view showing one example of a method for deriving information related to power transmission in the power transmitting apparatus according to the embodiment of the present invention.

FIG. 4 is an explanatory view showing one example of a method for deriving information related to power transmission in the power transmitting apparatus 100 according to the embodiment of the present invention. FIG. 4 shows a case where the power transmitting apparatus 100 derives the coupling coefficient $\kappa$ as information related to power transmission.

The power transmitting apparatus 100 transmits a start notification to start deriving the coupling coefficient $\kappa$ (start notification to start transmission of the first transmission power) to the power receiving apparatus 200 (S100).

When the start notification is transmitted in step S200, the power transmitting apparatus 100 determines whether or not a response from the power receiving apparatus 200 is received (S102). The power transmitting apparatus 100 can perform the determination of step S102 depending on whether or not the power consumption information Prcv transmitted from the power receiving apparatus 200 in response to the reception of the start notification in step S100 is received. The power consumption information Prcv is the information indicating the power consumption necessary for detecting that the received power level meet the predetermined level in the power receiving apparatus 200. The power consumption information Prcv is used to derive the coupling coefficient $\kappa$ in step S114, to be hereinafter described.

If determined that the response from the power receiving apparatus 200 is not received in step S102, the power transmitting apparatus 100 determines whether or not a predetermined time has elapsed (time out) (S104). If determined that the predetermined time has not elapsed in step S104, the power transmitting apparatus 100 repeats the processes from step S102. If determined that the predetermined time has elapsed in step S104, the power transmitting apparatus 100 notifies the power receiving apparatus 200 that power may not be transmitted (S120).

If determined that the response from the power receiving apparatus 200 is received in step S102, the power transmitting apparatus 100 retrieves the received power consumption information Prcv (S106). If the power consumption information Prcv is received as the response from the power receiving apparatus 200 in step S202, the power transmitting apparatus 100 may not perform the process of step S106.

After retrieving the power consumption information Prcv in step S106, the power transmitting apparatus 100 performs an initial setting of the first transmission power Ptrans(k) (S108). The first transmission power Ptrans(k) is the transmission power for deriving the information related to power transmission. The power transmitting apparatus 100 increases discretely the first transmission power to transmit to the power receiving apparatus 200 until receiving received power information indicating that the received power level meet the predetermined level transmitted from the power receiving apparatus 200. The power transmitting apparatus 100 can derive the coupling coefficient κ corresponding to the state related to transmission of power while reducing the possibility of transmitting a power overly exceeding the power necessary for the power receiving apparatus 200 to operate by increasing discretely the first transmission power Ptrans(k).

In FIG. 4, an example where the power transmitting apparatus 100 sets the value of k corresponding to the initial value of the first transmission power Ptrans(k) to k=0, and sets the value of kmax corresponding to the maximum value of the first transmission power Ptrans(k) to kmax=10 is shown. Further, in FIG. 4, a case where the process of step S108 is performed after the process of step S106 is shown, but the process of step S106 and the process of step S108 may be independently performed. Therefore, the power transmitting apparatus 100 can perform the process of step S106 after the process of step S108, or can perform the process of step S106 and the process of step S108 in synchronization.

After the initial setting of the first transmission power Ptrans(k) is performed in step S108, the power transmitting apparatus 100 transmits the first transmission power Ptrans(k) (S110). The power transmitting apparatus 100 can uniquely transmit the first transmission power Ptrans(k) corresponding to the value of k by using the look up table in which the value of k and the value of the first transmission power Ptrans(k) are corresponded, but is not limited thereto.

The power transmitting apparatus 100 that transmitted the first transmission power Ptrans(k) in step S110 determines whether or not the received power information is received (S112). The power transmitting apparatus 100 may be provided with a predetermined standby time for the determination of step S112.

If determined that the received power information is not received in step S112, the power transmitting apparatus 100 determines whether or not the value of k is a maximum value (S116). If determined that the value of k is the maximum value in step S116, the power transmitting apparatus 100 transmits the notification that power may not be transmitted to the power receiving apparatus 200 (S120), and terminates the power transmission process. If determined that the value of k is not the maximum value in step S116, the power transmitting apparatus 100 adds one to the value of k (S118), and repeats the processes from step S110.

If determined that the received power information is received in step S112, the power transmitting apparatus 100 derives the coupling coefficient κ (one example of information related to power transmission) based on the first transmission power Ptrans(k) when receiving the received power information and the power consumption information Prcv retrieved in step S106 (S114). More specifically, the power transmitting apparatus 100 derives the coupling coefficient κ from the following Formula 1.

$$\kappa = Prcv/Ptrans(k) \qquad \text{(Formula 1)}$$

The power transmitting apparatus 100 may derive the information related to power transmission by using the method shown in FIG. 4.

After deriving the information related to power transmission, the power transmitting apparatus 100 determines the transmission power Ps to transmit in each power transmission slot based on the information of the requesting power transmission amount contained in the power transmission request and the derived information related to power transmission. More specifically, the power transmitting apparatus 100 determines the transmission power Ps from the following Formula 2. Pr shown in Formula 2 indicates the desired receiving power contained in the information of the requesting power transmission amount.

$$Ps = Pr/\kappa \qquad \text{(Formula 2)}$$

As shown in Formula 2, the power Ps for every power transmission slot determined by Formula 2 becomes a value dependent on the coupling coefficient κ (one example of information related to power transmission). That is, the power transmitting apparatus 100 can set the power to transmit in each power transmission slot to a value corresponding to the state related to transmission of power at before transmitting power to the power receiving apparatus 200. Therefore, since the power transmitting apparatus 100 can transmit the power suited to the state related to transmission of power at before the transmission of power in each power transmission slot, various drawbacks described above in the power receiving apparatus 200 can be prevented.

Furthermore, the power transmitting apparatus 100 can determine that the power may not be stably transmitted to the power receiving apparatus 200 when the power Ps for every power transmission slot determined by Formula 2 exceeds the power amount (total power transmission amount) that can be transmitted in the power transmission slot. In such case, the power transmitting apparatus 100 notifies the power receiving apparatus 200 that the power may not be transmitted.

(1-1-B) Second Example of Allocation Process

The power transmitting apparatus 100 performs allocation to the power transmission slot based on the drive information contained in the power transmission request. The drive information is the information indicating whether the received power is directly used for driving. When the drive information contained in the power transmission request indicates that the received power is directly used for driving, this indicates that the power receiving apparatus 200 that transmitted power transmission request desires the most stable power reception. Therefore, the power transmitting apparatus 100 preferentially allocates to a plurality of continuous power transmission slots when receiving the drive information indicating that the received power is directly used for driving (see e.g., power transmission slots 3 and 4 in FIG. 2). The power transmitting apparatus 100 using the second example of the allocation process derives the information related to power transmission and determines the power to transmit in each power transmission slot, similar to when using the first example of the allocation process. The power transmitting apparatus 100 can more stably operate the power receiving apparatus 200 driven by directly using the received power by allocating to the power transmission slot based on the drive information contained in the power transmission request.

(1-1-C) Third Example of Allocation Process

The power transmitting apparatus 100 can perform allocation to the power transmission slot by combining the first example of the allocation process and the second example of the allocation process, that is, based on the power transmission slot number information and the drive information contained in the power transmission request.

The power transmitting apparatus 100 adopting the first allocation example allocates one power receiving apparatus 200 to one power transmission slot, as described above. Therefore, the power transmitting apparatus 100 can lower the possibility of various drawbacks such as each power receiving apparatus 200 may not obtain the power necessarily for operation.

The allocation process in the power transmitting apparatus 100 according to the embodiment of the present invention is not limited to the first to the third examples. For instance, the power transmitting apparatus 100 may set one of the power transmission slots as a power transmission slot in which power is constantly transmitted. By setting such power transmission slot, the power transmitting apparatus 100 can supply an initial power necessary for minimum driving to the devices that can be driven with a relatively small power such as sensor and clock, devices in which the battery (one example of internal power supply) ran out, and the like. Since such devices (one example of power receiving apparatus 200) can obtain the initial power from the power transmitting apparatus 100, the relevant devices can transmit the power transmission request to the power transmitting apparatus 100 using such initial power.

(1-2) Second Allocation Example

An example where the power transmitting apparatus 100 allocates one power receiving apparatus 200 to one power transmission slot has been shown in the first allocation example. However, the allocation example in the power transmitting apparatus 100 according to the embodiment of the present invention is not limited thereto. The second allocation example where the power transmitting apparatus 100 allocates one or more power receiving apparatuses 200 to one power transmission slot will be described below.

Figure 5:
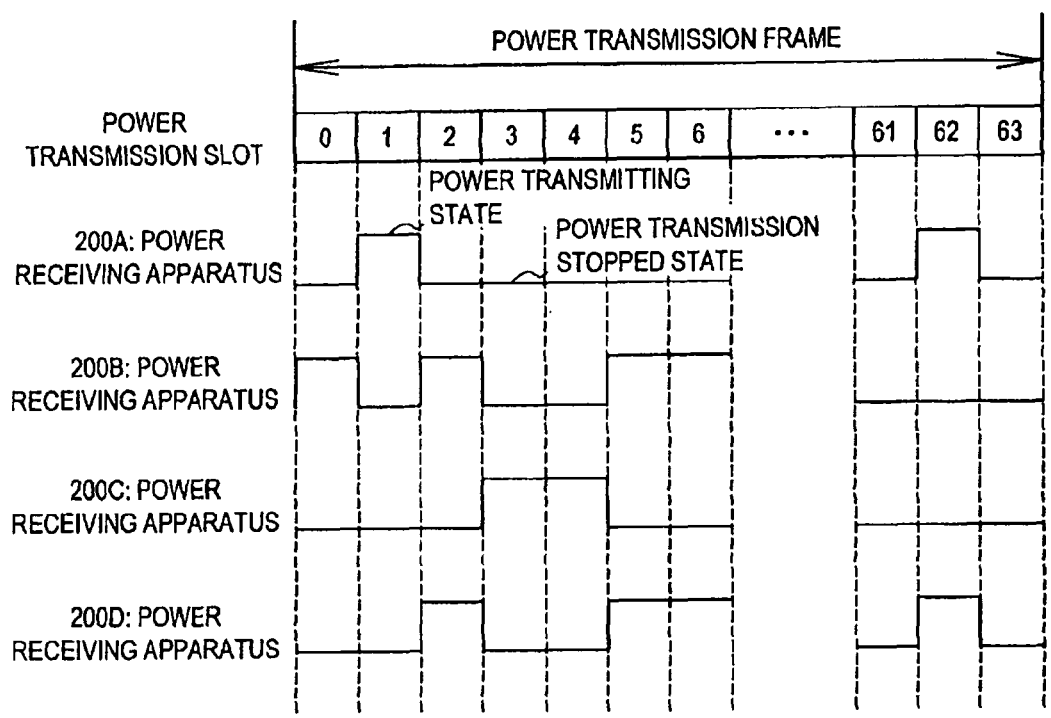
FIG. 5 is an explanatory view showing a second example of the allocation to the power transmission slot (dividing period) in the power transmitting apparatus according to the embodiment of the present invention.

FIG. 5 is an explanatory view showing a second example of the allocation to the power transmission slot (dividing period) in the power transmitting apparatus 100 according to the embodiment of the present invention. Similar to FIG. 2, FIG. 5 shows an example where one power transmission frame is divided into 64 power transmission slots.

With reference to FIG. 5, in the second allocation example, the power transmitting apparatus 100 allocates one or more power receiving apparatus 200 to one divided slot. The power transmitting apparatus 100 related to the second allocation example performs the allocation of the power transmission slot basically similar to when using the first allocation example described above. The power transmitting apparatus 100 related to the second allocation example further allocates two or more power receiving apparatuses to one power transmission slot based on information related to power transmission for every power receiving apparatus 200 from which the derived power transmission request is received. For instance, when deriving the coupling coefficient κ for the information related to power transmission, the power receiving apparatus 200, which derived coupling coefficient κ is within a predetermined range, is allocated to one power transmission slot.

The advantage of allocating the power receiving apparatus 200, which coupling coefficient κ is within a predetermined range, to one power transmission slot will be described. A case where the power transmitting apparatus 100 transmits power to three power receiving apparatuses 200A, 200B, and 200C in one power transmission slot will be described below by way of example. Furthermore, the coupling coefficient between the power transmitting apparatus 100 and the power receiving apparatus 200A is set as κ1, the coupling coefficient between the power transmitting apparatus 100 and the power receiving apparatus 200B is set as κ2, and the coupling coefficient between the power transmitting apparatus 100 and the power receiving apparatus 200C is set as κ2 is set as κ3. The transmission power corresponding to the power receiving apparatus 200A is Pr1, the transmission power corresponding to the power receiving apparatus 200B is Pr2, and the transmission power corresponding to the power receiving apparatus 200C is Pr3.

In the above case, the coupling coefficient κtotal in the entire power receiving apparatus 200 is expressed with Formula 3, and the received power Pr_total in the entire power receiving apparatus 200 is expressed as Formula 4 from Formulae 1 and 3.

$$\kappa total = \frac{1}{3} \cdot (\kappa 1 + \kappa 2 + \kappa 3) \quad \text{(Formula 3)}$$

$$Pr\_total = PS \cdot \kappa total \quad \text{(Formula 4)}$$

The transmission power Ps transmitted from the power transmitting apparatus 100 in a certain power transmission slot is approximately distributed at a ratio proportional to the coupling coefficients κ1, κ2, and κ3, and the received power Pr1, Pr2, and Pr3 in each power receiving apparatus 200 is expressed with Formulae 5 to 7 below.

$$Pr1 = (Ps \cdot \kappa total) \cdot \kappa 1 / (\kappa 1 + \kappa 2 + \kappa 3) \quad \text{(Formula 5)}$$
$$= 1/3 \cdot Ps \cdot \kappa 1$$

$$Pr2 = (Ps \cdot \kappa total) \cdot \kappa 2 / (\kappa 1 + \kappa 2 + \kappa 3) \quad \text{(Formula 6)}$$
$$= 1/3 \cdot Ps \cdot \kappa 2$$

$$Pr3 = (Ps \cdot \kappa total) \cdot \kappa 3 / (\kappa 1 + \kappa 2 + \kappa 3) \quad \text{(Formula 7)}$$
$$= 1/3 \cdot Ps \cdot \kappa 3$$

Assume a case where the values of the coupling coefficient κ1 of the power receiving apparatus 200A and the coupling coefficient κ2 of the power receiving apparatus 200B are 0.5, and the value of the coupling coefficient κ3 of the power receiving apparatus 200C is 0.2. In this case, if the power transmitting apparatus 100 transmits power such that the received power of each power receiving apparatus 200A, 200B, and 200C in one power transmission slot is at least 1 [W], the power transmitting apparatus 100 desirably transmits power of 15[W] in the relevant power transmission slot according to Formulae 5 to 7.

Assume that the coupling coefficient κ1=κ2=κ3=0.5 in one power transmission slot in the power transmitting apparatus 100. In this case, if the power transmitting apparatus 100 transmits power such that the received power of each power receiving apparatus 200A, 200B, and 200C in one power transmission slot is at least 1[W], the power transmitting apparatus 100 transmits power of 6[W] in the relevant power transmission slot according to Formulae 5 to 7.

As described above, the power transmitting apparatus 100 can reduce the power to transmit in one transmission slot by allocating the power receiving apparatus 200 having the same coupling coefficient in one power transmission slot. For instance, when the power transmitting apparatus 100 transmits power of 2[W] to the two power receiving apparatuses 200, which coupling coefficient is k=0.5, and to one power receiving apparatus 200, which coupling coefficient is k=0.2, for every other power transmission slot the power transmitting apparatus 100 alternately transmits 4[W] and 10 [W]. In the above case, the power of about 53% can be reduced compared to when the power transmitting apparatus 100 transmits 15[W] in every power transmission slot. A case of allocating the power receiving apparatus 200 having the same coupling coefficient κ to one power transmission slot has been described above, but is not limited thereto. Similar effects can be obtained by having the power transmitting apparatus 100 allocate the power receiving apparatus 200 within a predetermined range to one power transmission slot.

The power transmitting apparatus 100 related to the second allocation example allocates one or more power receiving apparatus 200 to one power transmission slot as described above. In this case, the power transmitting apparatus 100 related to the second allocation example performs allocation of the power transmission slot basically similar to when using the first allocation example described above. Therefore, the power transmitting apparatus 100 can lower the possibility of various drawbacks such as each power receiving apparatus 200 may not obtain the power necessary for operation even when using the second allocation example, similar to when using the first allocation example described above.

(1-3) Generation of Power Transmission Table Based on Allocation to Dividing Period (Power Transmission Slot)

The power transmitting apparatus 100 generates the power transmission table based on the allocation result to each power transmission slot in (1-1) or (1-2). The power transmission table is a table recorded with power to transmit in each power transmission slot, and the like, where the power transmitting apparatus 100 transmits power based on the power transmission table.

FIG. 6 is an explanatory view showing one example of the power transmission table according to the embodiment of the present invention. Here, FIG. 6 shows an example where one power transmission frame is divided into 64 power transmission slots. FIG. 6 also shows a case where the power transmitting apparatus 100 selectively transmits power to four power receiving apparatuses 200A, 200B, 200C, and 200D.

With reference to FIG. 6, the power transmission table has items of slot number i (i is a natural number (include zero)), Status Si, coupling coefficient κi, total power transmission request Di, power transmission amount Psi, converted power transmission margin Ri, and allocation BMPi.

The slot number i indicates the power transmission slot number. Status Si indicates the state of each power transmission slot. Here, the state of the power transmission slot includes "0", indicating vacancy of the power transmission slot, "1" indicating transmission of power to the power receiving apparatus 200 operating in a mode of charging the internal power supply, "2" indicating transmission of power to the power receiving apparatus 200 driven by directly using the received power, "3" indicating transmission of power to other power receiving apparatuses 200, and the like, but is not limited thereto.

The coupling coefficient κi indicates the coupling coefficient κ (one example of information related to power transmission) with the power receiving apparatus 200 to transmit power in each power transmission slot. Here, the power transmitting apparatus 100 can allocate the power receiving apparatus 200 having the same coupling coefficient κ or within a predetermined range to one power transmission slot when transmitting power to one or more power receiving apparatus 200, as described above. FIG. 6 shows a case where the power transmitting apparatus 100 allocates the power receiving apparatus 200 having the same coupling coefficient κ to one power transmission slot.

The total power transmission request Di indicates the total amount of power requested by the power receiving apparatus 200 allocated to each power transmission slot. The power transmitting apparatus 100 derives the total power transmission request Di based on the information of the requesting power transmission amount contained in the power transmission request transmitted from the power receiving apparatus 200.

The power transmission amount Psi indicates the power transmitted by the power transmitting apparatus 100 in each power transmission slot. The power transmitting apparatus 100 derives the power transmission amount Psi using Formulae 2, 4, and the like.

The converted power transmission margin Ri indicates a value obtained by converting the power transmissible in each power transmission slot to the power desired by the power receiving apparatus 200. The power transmitting apparatus 100 subtracts the power to transmit in the power transmission slot from the maximum power transmissible in the relevant power transmission slot and multiplies the coupling coefficient κ to derive the converted power transmission margin Ri. For instance, if the maximum power transmissible in the power transmission slot is 20[W], the power transmitting apparatus 100 can derive the converted power transmission margin Ri from the following Formula 8, but is not limited thereto.

$$Ri = \kappa i \cdot (20 - Psi) \quad \text{(Formula 8)}$$

The allocation BMPi indicates the allocation of the power receiving apparatus 200 in each power transmission slot in a bitmap format. In FIG. 6, the power receiving apparatus 200 is expressed with four bits, each bit indicating the power receiving apparatus 200A, 200B, 200C, and 200D. FIG. 6 also shows that when one is set for the bit, the power transmitting apparatus 100 corresponding to the relevant bit is allocated.

The power transmitting apparatus 100 generates the power transmission table shown in FIG. 6 based on the allocation result to each power transmission slot in (1-1) or (1-2). The power transmitting apparatus 100 can have the content of each power transmission slot correspond to each power transmission frame by updating the power transmission table, for example, but is not limited thereto. For instance, the power transmitting apparatus 100 may generate the power transmission table for every power transmission frame.

(2) Transmission of Power Based on Allocation to Dividing Period (Power Transmission Slot)

The power transmitting apparatus 100 transmits power based on the allocation result to each power transmission slot in (1). More specifically, the power transmitting apparatus 100 transmits power based on the power transmission table generated in (1-3). Therefore, the power transmitting apparatus 100 can transmit power to the power receiving apparatus 200 while lowering the possibility of various drawbacks such as the power receiving apparatus 200 may not obtain the power necessary for operation. An example where the power transmitting apparatus 100 generates the power transmission table shown in FIG. 6 based on the allocation result, and transmits power based on the relevant power transmission table has been described above, but it should be recognized that the power transmitting apparatus according to the embodiment of the present invention is not limited to the above.

The power transmission system 1000 according to the embodiment of the present invention takes the power transmission approach such as (1) and (2) described above so that the power transmitting apparatus 100 can stably transmit power to one or more power receiving apparatus 200.

Figure 7:
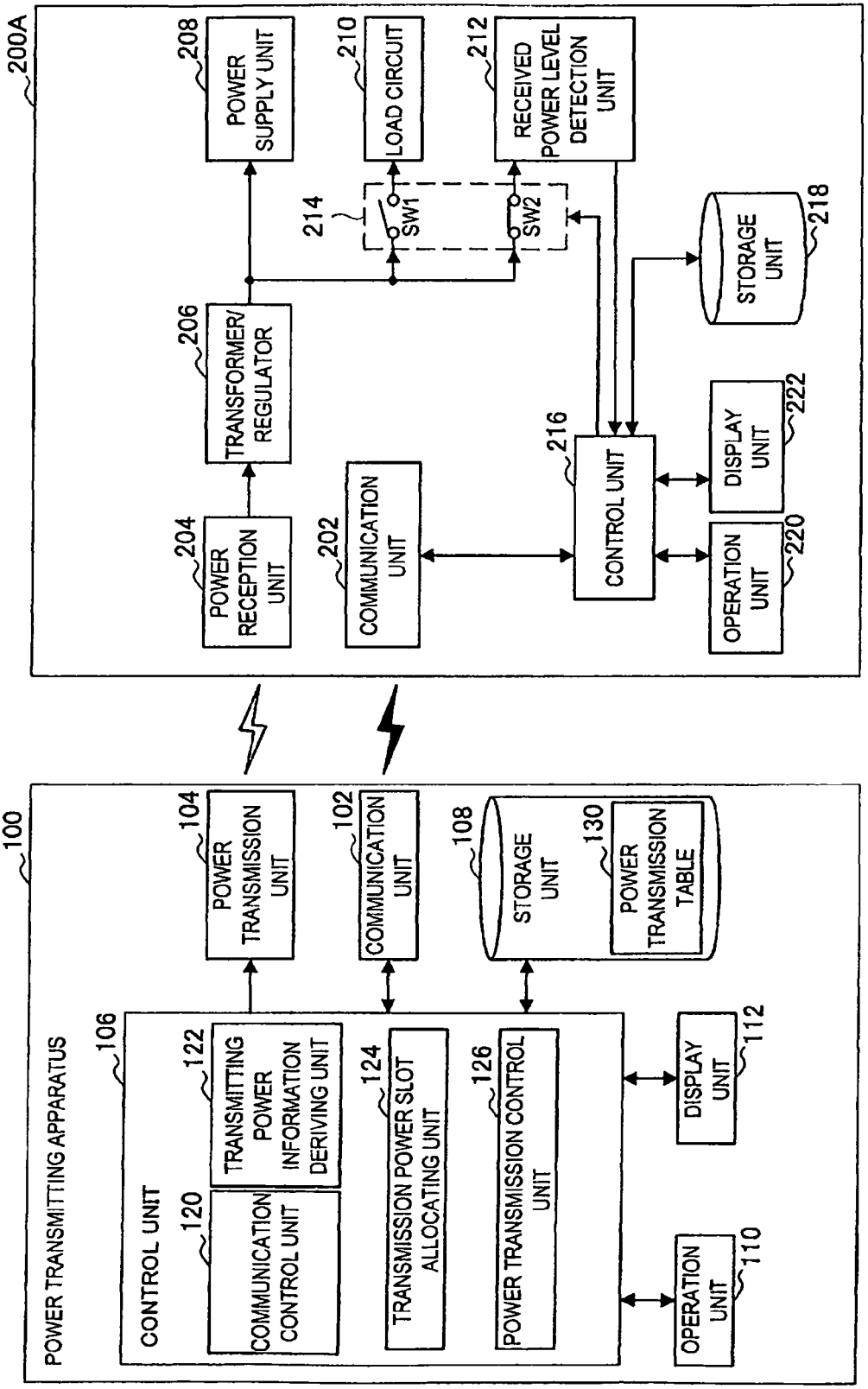
FIG. 7 is an explanatory view showing one example of a configuration of the power transmission system according to the embodiment of the present invention.

The power transmitting apparatus 100 and the power receiving apparatus 200 configuring the power transmission system 1000 capable of realizing the above-described power transmission approach will be described below. The power receiving apparatus 200A of the power receiving apparatus 200 will be described below, and the description on other power receiving apparatus 200 will be omitted as it has a similar configuration. FIG. 7 is an explanatory view showing one example of a configuration of the power transmission system 1000 according to the embodiment of the present invention. As shown in FIG. 7, the power transmitting apparatus 100 and the power receiving apparatus 200A transmit power in a non-contact manner.

Before describing the configurations of the power transmitting apparatus 100 and the power receiving apparatus 200A configuring the power transmission system 1000, the power transmitting means according to the embodiment of the present invention will be first described. The power transmitting means will be described below focusing on a power transmission unit 104 arranged in the power transmitting apparatus 100 and a power reception unit 204 arranged in the power receiving apparatus 200A shown in FIG. 7.

Power Transmitting Means According to Embodiment of the Present Invention

Figure 8:
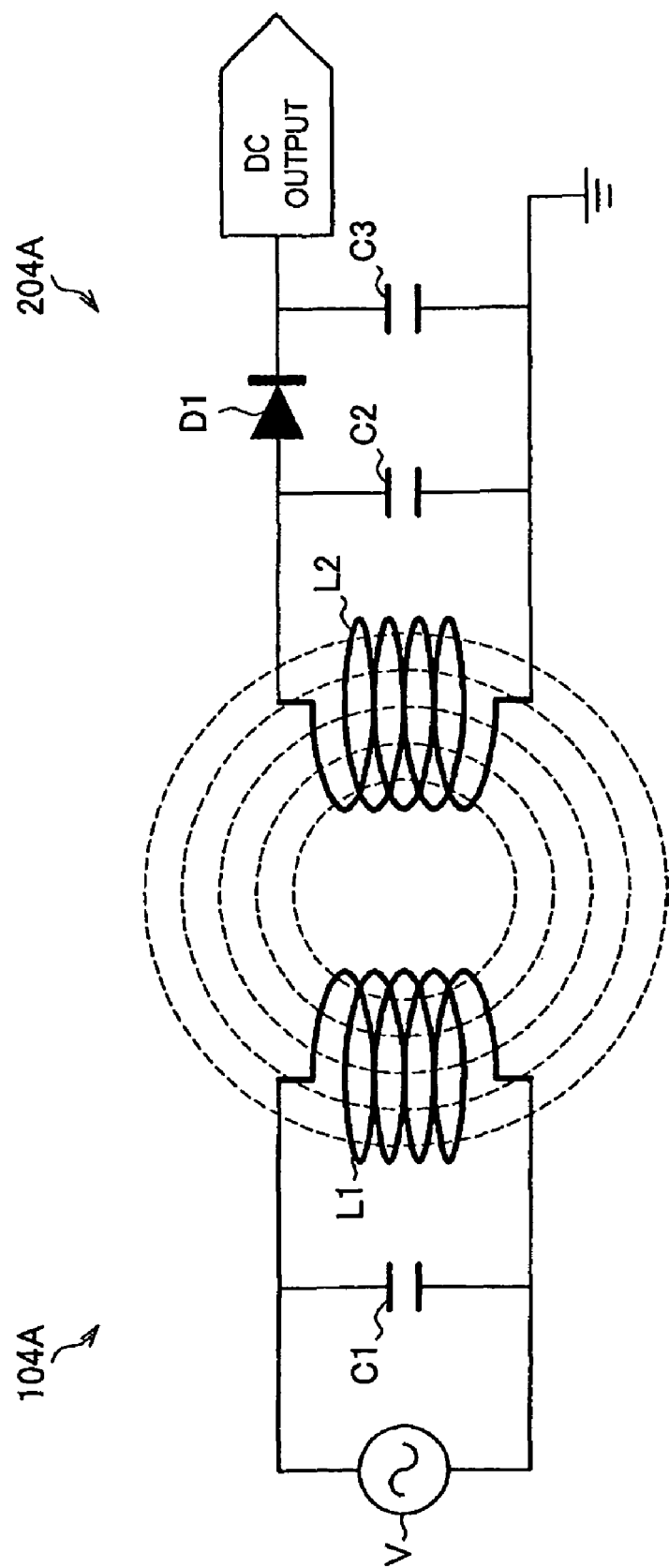
FIG. 8 is an explanatory view describing a first power transmitting means according to the embodiment of the present invention.

[1] First Transmitting Means: Transmission of Power Using Electromagnetic Induction FIG. 8 is an explanatory view describing the first power transmitting means according to the embodiment of the present invention. FIG. 8 shows a configuration example of the power transmission unit 104A of the power transmitting apparatus 100 that transmits power using electromagnetic induction and the power reception unit 204A of the power receiving apparatus 200A.

With reference to FIG. 8, the power transmission unit 104A includes an AC power supply V, a capacitor C1, and an inductor L1. The power reception unit 204A includes an inductor L2, a capacitor C2, a capacitor C3, and a diode D1. The power transmission unit 104A flows AC current to the inductor L1 by the AC power supply V, and generates a magnetic flux at the periphery of the inductor L1. The power reception unit 204A obtains a DC current by rectifying the AC current flowed to the inductor L2 by the magnetic flux with the diode D1 and the capacitor C3. Therefore, the power receiving apparatus 200A applied with the first transmitting means can obtain power from the power transmitting apparatus 100.

When using the power transmitting means using the electromagnetic induction as shown in FIG. 8, for example, the transmission efficiency of power is varied by changing the number of windings and the arrangement position of the inductor L1 and the inductor L2 to thereby optimize the transmission efficiency.

[2] Second Transmitting Means: Transmission of Power Using Electric Wave

Figure 9:
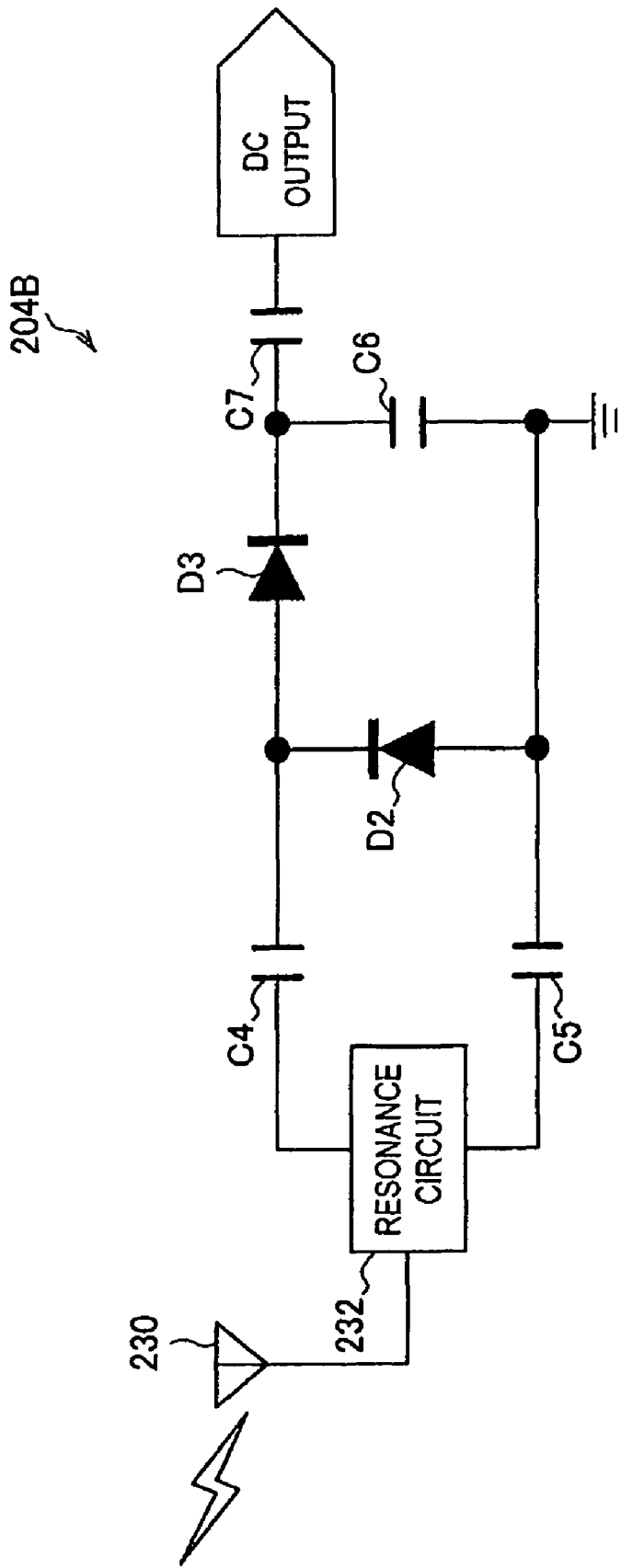
FIG. 9 is an explanatory view describing a second power transmitting means according to the embodiment of the present invention.

FIG. 9 is an explanatory view describing the second power transmitting means according to the embodiment of the present invention. FIG. 9 shows a configuration example of a power reception unit 204B of the power receiving apparatus 200A that receives power using electric wave.

As shown in FIG. 9, the power reception unit 204B includes an antenna 230, a resonance circuit 232, a capacitor C4, a capacitor C5, a diode D2, a diode D3, a capacitor C6, and a capacitor C7. The resonance circuit 232 is configured by a capacitor having a predetermined electrostatic capacity and an inductor having a predetermined inductance. In the above configuration, when the antenna 230 receives the electric wave transmitted from a power transmission unit 104B (not shown) of the power transmitting apparatus 100, the AC current is supplied from the antenna 230 to the resonance circuit 232, and the resonance circuit 232 amplifies the AC current by resonance. Furthermore, the power reception unit 204B extracts the DC component and obtains the DC current by rectifying the amplified AC current with a rectifier circuit including the diode D3 and the capacitor C6. Therefore, the power receiving apparatus 200A applied with the second transmitting means can obtain power from the power transmitting apparatus 100.

Figure 10:
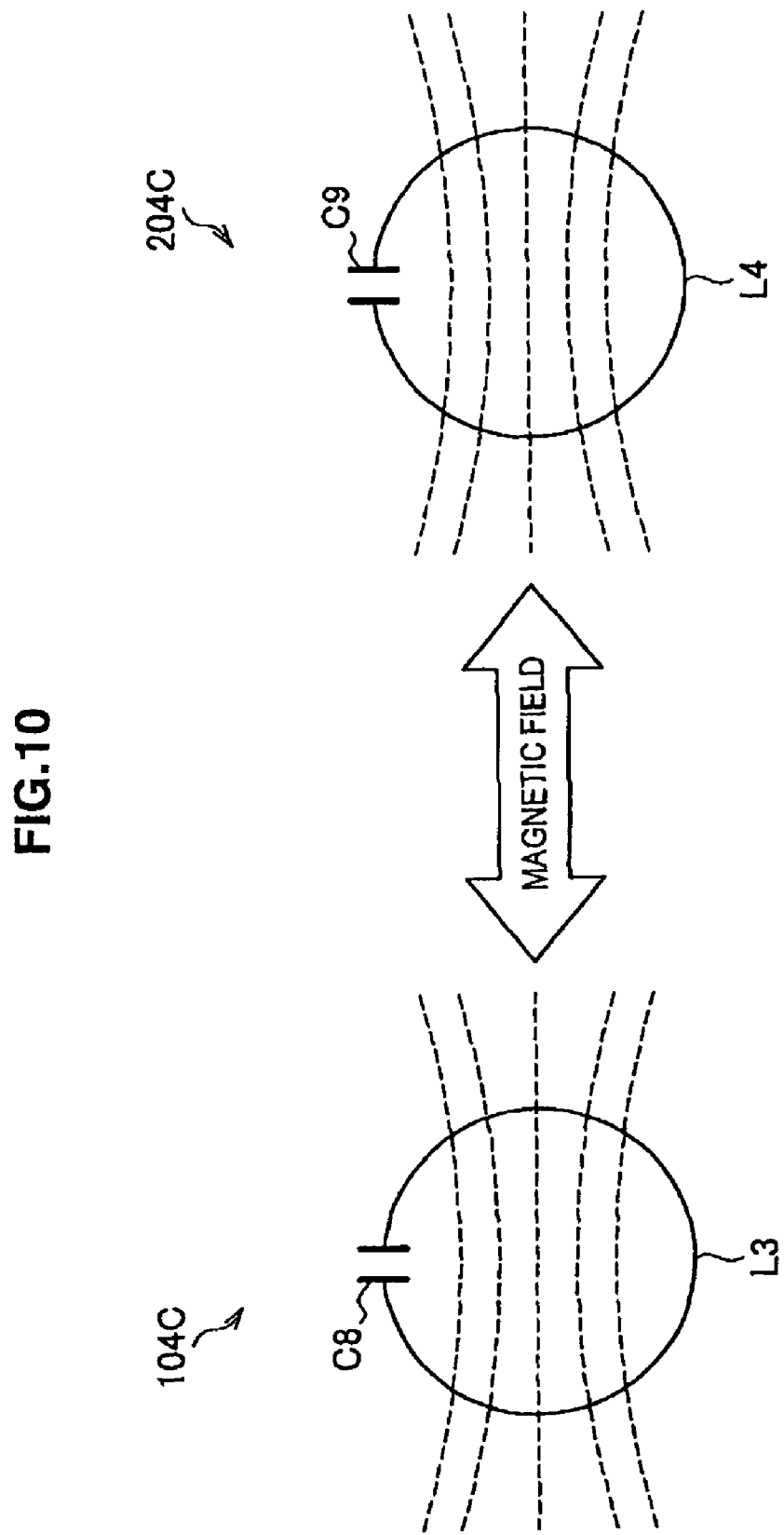
FIG. 10 is an explanatory view describing a third power transmitting means according to the embodiment of the present invention.

[3] Third Transmitting Means: Transmission of Power Using Magnetic Field Resonance FIG. 10 is an explanatory view describing the third power transmitting means according to the embodiment of the present invention. FIG. 10 shows a configuration example of a power transmission unit 104C of the power transmitting apparatus 100 and a power reception unit 204C of the power receiving apparatus 200A, which perform reception of power using magnetic field resonance.

The power transmission unit 104C includes a resonance circuit with a capacitor C8 and an inductor L3 as shown in FIG. 10, and an AC power supply (not shown) or the like is connected to the resonance circuit. The power reception unit 204C includes a capacitor C9 and an inductor L4. The third transmitting means is a transmitting means that uses the principle of resonance that when two transducers having unique number of vibrations are lined, the vibration applied to one transducer is also transmitted to the other transducer. Therefore, the transmission efficiency can be optimized by adjusting the respective electrostatic capacity and the inductance such that the resonance frequency by the capacitor C8 and the inductor L3 of the power transmission unit 104C and the resonance frequency by the capacitor C9 and the inductor L4 of the power reception unit 204C become equal. Through the use of the principle of resonance described above, the power receiving apparatus 200A applied with the third transmitting means can obtain power from the power transmitting apparatus 100.

The power transmission (third transmitting means) using the principle of resonance as described above has higher power transmission efficiency than the transmission of power using electromagnetic induction (first transmitting means) and the transmission of power using electric wave (second transmitting means). The power receiving apparatus 200A applied with the third transmitting means can receive a power of about a few kilowatts if the distance with the power transmitting apparatus 100 is a few meters.

Figure 11:
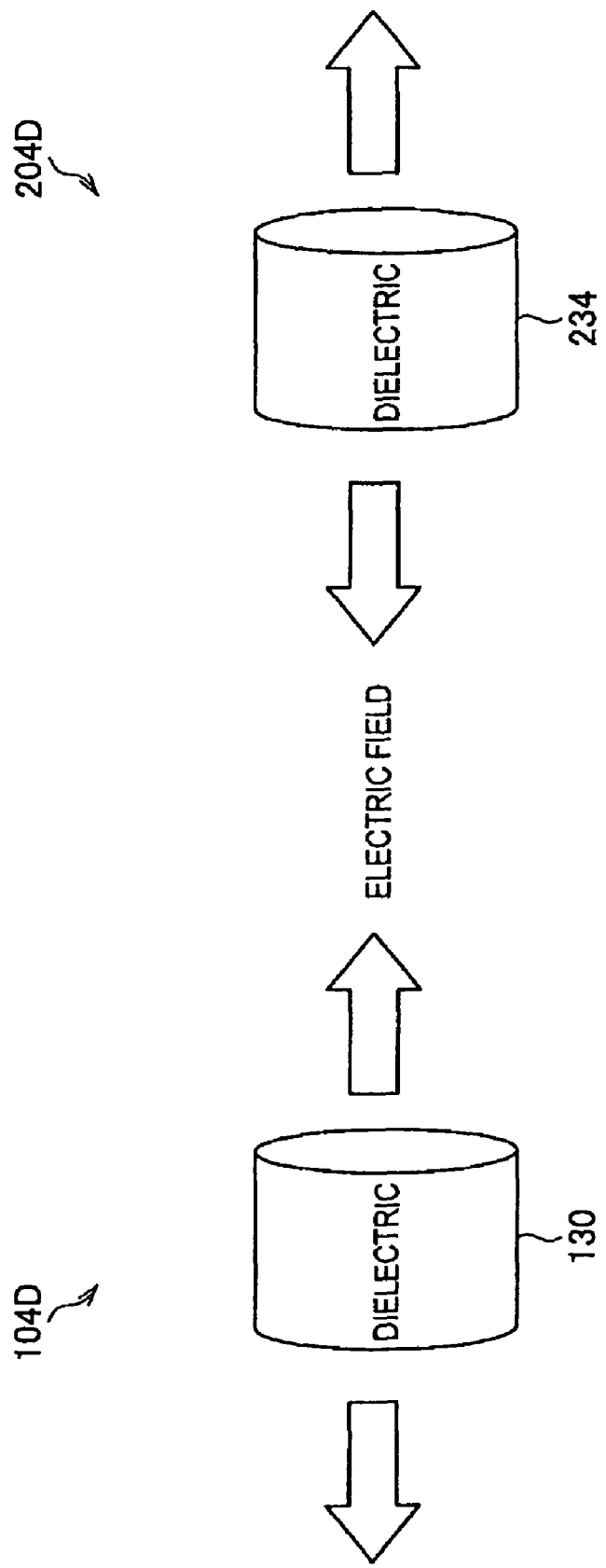
FIG. 11 is an explanatory view describing a fourth power transmitting means according to the embodiment of the present invention.

[4] Fourth Transmitting Means: Transmission of Power Using Electric Field Resonance FIG. 11 is an explanatory view describing the fourth power transmitting means according to the embodiment of the present invention. FIG. 11 shows a configuration example of a power transmission unit 104D of the power transmitting apparatus 100 and a power reception unit 204D of the power receiving apparatus 200A, which perform reception of power using electric field resonance.

Similar to the third transmitting means, the fourth transmitting means is a transmitting means that uses the principle of resonance that when two transducers having unique number of vibrations (dielectric 130 and dielectric 234 in FIG. 11) are lined, the vibration applied to one dielectric is also transmitted to the other dielectric. Therefore, the transmission efficiency can be optimized by selecting the respective dielectric such that the resonance frequency at the dielectric 130 of the power transmission unit 104D and the resonance frequency at the dielectric 234 of the power reception unit 204D become equal. Through the use of the principle of resonance described above, the power receiving apparatus 200A applied with the fourth transmitting means can obtain power from the power transmitting apparatus 100, similar to the power receiving apparatus 200 applied with the third transmitting means.

In the power transmission system 1000 according to the embodiment of the present invention, power is transmitted from the power transmitting apparatus 100 to the power receiving apparatus 200A by using the first to the fourth transmitting means described in [1] to [4]. It should be noted that the power transmitting means in the power transmission system 1000 according to the embodiment of the present invention is not limited to the first to the fourth transmitting means.

The configuration of the power transmitting apparatus 100 and the power receiving apparatus 200A configuring the power transmission system 1000 will be described by again referencing FIG. 7.

[Power Transmitting Apparatus 100]

First, the power transmitting apparatus 100 will be described. The power transmitting apparatus 100 includes a communication unit 102 (power transmission side communication unit), the power transmission unit 104, a control unit 106, a storage unit 108, an operation unit 110, and a display unit 112.

The power transmitting apparatus 100 may include a ROM (Read Only Memory; not shown) recorded with programs and control data such as calculation parameter used by the control unit 106; a RAM (Random Access Memory; not shown) for primary storing programs and the like executed by the control unit 106; and the like. The power transmitting apparatus 100 connects each components by a bus serving as a data transmission path.

[Hardware Configuration Example of Power Transmitting Apparatus 100]

Figure 12:
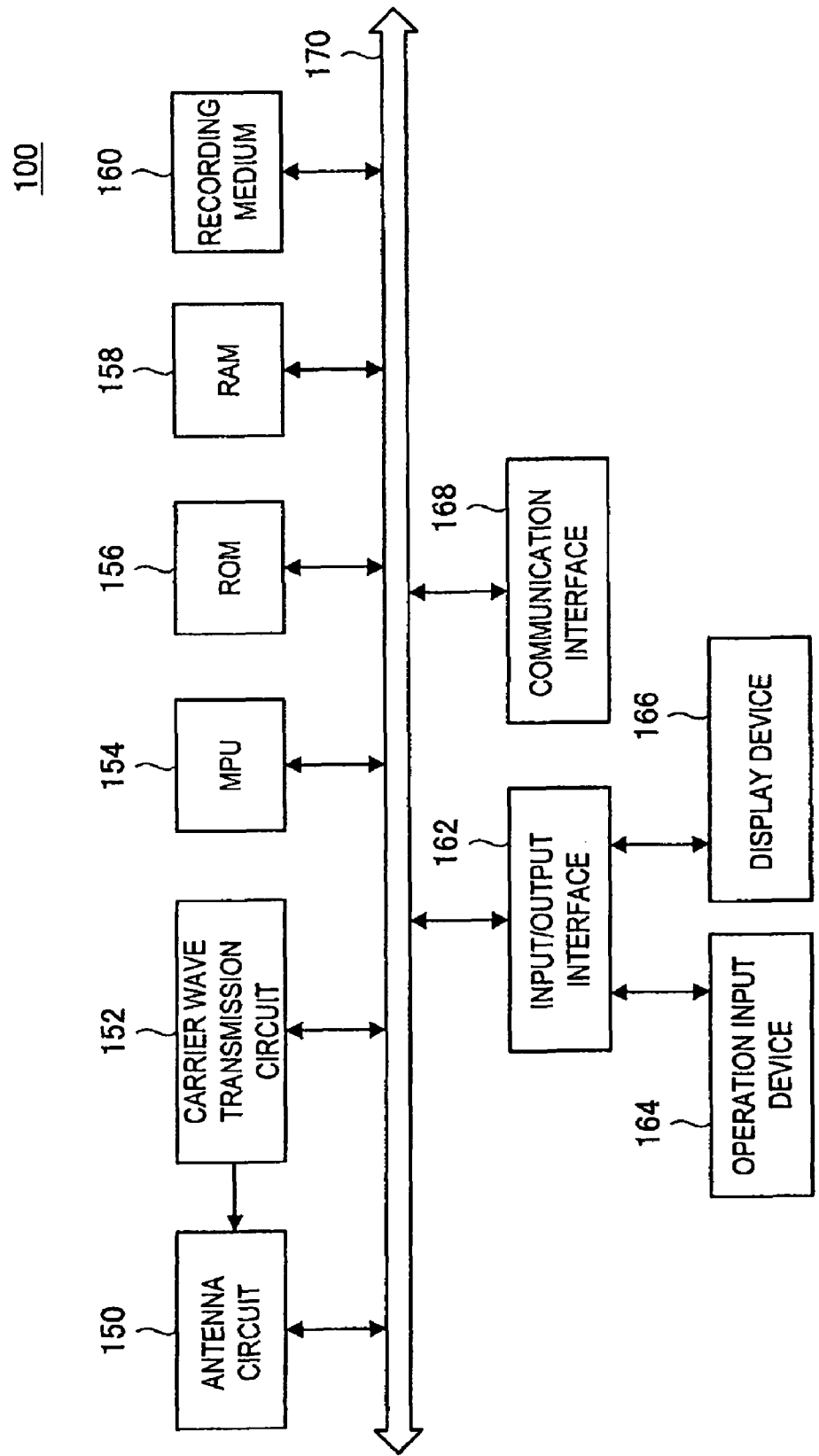
FIG. 12 is an explanatory view showing one example of a hardware configuration of the power transmitting apparatus according to the embodiment of the present invention.

FIG. 12 is an explanatory view showing one example of a hardware configuration of the power transmitting apparatus 100 according to the embodiment of the present invention. With reference to FIG. 12, the power transmitting apparatus 100 includes an antenna circuit 150, a carrier wave transmission circuit 152, an MPU 154, a ROM 156, a RAM 158, a recording medium 160, an input/output interface 162, an operation input device 164, a display device 166, and a communication interface 168. The power transmitting apparatus 100 connects each component by a bus 170 serving as a transmission path of data and the like.

The antenna circuit 150 and the carrier wave transmission circuit 152 function as the power transmission 104 in the power transmitting apparatus 100. Thus, the antenna circuit 150 and the carrier wave transmission circuit 152 may adopt the configurations corresponding to FIGS. 8 to 11 to realize the first to the fourth power transmitting means. For instance, the antenna circuit 150 is configured by a resonance circuit including a coil having a predetermined inductance serving as a transmission/reception antenna and a capacitor having a predetermined electrostatic capacity, but is not limited thereto. The carrier wave transmission circuit 152 is configured by an AC power supply, an amplification circuit for amplifying the output of the AC power supply, and the like.

The MPU 154 functions as the control unit 106 for controlling the entire power transmitting apparatus 100. The MPU 154 may also serve as the communication control unit 120, a transmission power information deriving unit 122, a power transmission slot allocating unit 124, and a power transmission control unit 126, to be hereinafter described, in the power transmitting apparatus 100.

The ROM 156 stores the programs and the control data such as the calculation parameter used by the MPU 154, and the RAM 158 primary stores the programs, and the like executed by the MPU 154.

The recording medium 160 functions as the storage unit 108, and stores power transmission table shown in FIG. 6, coupling coefficient κ (one example of information related to power transmission) of each power receiving apparatus 200, application, and the like. The recording medium 160 may be a magnetic recording medium such as hard disk, or a non-volatile memory such as EEPROM (Electrically Erasable and Programmable Read Only Memory), flash memory, MRAM (Magnetoresistive Random Access Memory), FeRAM (Ferroelectric Random Access Memory), and PRAM (Phase change Random Access Memory), but is not limited thereto.

The input/output interface 162 connects the operation input device 164 and the display device 166. The operation input device 164 functions as the operation unit 110, and the display device 166 functions as the display unit 112. The input/output interface 162 may be a USB (Universal Serial Bus) terminal, DVI (Digital Visual Interface) terminal, HDMI (High-Definition Multimedia Interface) terminal, and the like, but is not limited thereto. The operation input device 164 may be a button, a direction key, a rotary selector such as a jog dial, or a combination thereof, and is arranged on the power transmitting apparatus 100 and connected to the input/output interface 162 at the interior of the power transmitting apparatus 100. The display device 166 may be an LCD (Liquid Crystal Display), organic EL (Electro Luminescence) display, or OLED display (Organic Light Emitting Diode display), and the like, and is arranged on the power transmitting apparatus 100 and connected to the input/output interface 162 at the interior of the power transmitting apparatus 100. It should be recognized that the input/output interface 162 can be connected to an operation input device (e.g., keyboard and mouse) and a display device (e.g, external display) serving as an external device of the power transmitting apparatus 100.

The communication interface 168 is a communication means arranged in the power transmitting apparatus 100, and function as a communication unit 102 for wireless/wire communicating with the external device such as the power receiving apparatus 200. The communication interface 168 here may be communication antenna and RF circuit (wireless communication), IEEE 802.15.1 port and transmission/reception circuit (wireless communication), IEEE 802.11b port and transmission/reception circuit (wireless communication), LAN terminal and transmission/reception circuit (wire communication), or the like, but is not limited thereto.

The power transmitting apparatus 100 configures the power transmission system 1000 capable of realizing the power transmission approach according to the embodiment of the present invention by the hardware configuration shown in FIG. 12.

The configuration of the power transmitting apparatus 100 will be described with reference again to FIG. 7. The communication unit 102 is a communication means arranged in the power transmitting apparatus 100, and has a role of wire/wireless communicating with the external device such as the power receiving apparatus 200. The communication unit 102 may perform wireless communication with the external device such as the power receiving apparatus 200 using light, electric wave, or sound wave, but is not limited thereto. The communication unit 102 has its communication controlled by a communication control unit 120 arranged in the control unit 106.

The power transmission unit 104 is a power transmitting means arranged in the power transmitting apparatus 100, and has a role of transmitting power in a non-contact manner (wireless) to the external device such as the power receiving apparatus 200. The power transmission unit 104 can transmit power to the external device using electromagnetic induction (first transmitting means), electric wave (second transmitting means), and electric field or magnetic field resonance (third transmitting means, fourth transmitting means), but is not limited thereto. The power transmission unit 104 has its transmission of power controlled by a power transmission control unit 126 arranged in the control unit 106.

The control unit 106 is configured by MPU and the like, and has a role of controlling the entire power transmitting apparatus 100. The control unit 106 includes the communication control unit 120, the transmission power information deriving unit 122, the power transmission slot allocating unit 124, and the power transmission control unit 126.

The communication control unit 120 has a role of controlling the communication unit 102. As shown in FIG. 3, the communication control unit 120 transmits the power transmission frame synchronization signal S1, the power transmission slot synchronization signal S2, the allocation information S3, and the power transmission request accepting information to the communication unit 102. In this case, the communication control unit 120 reads out the power transmission table stored in the storage unit 108 based on the notification that the power transmission table transmitted from the power transmission slot allocating unit 124 has been updated, and transmits the allocation information S3 corresponding to the power transmission frame, but is not limited thereto. When the power transmitting apparatus 100 transmits power to the external device using electric field or magnetic field resonance (third transmitting means, fourth transmitting means), the power transmitting apparatus 100 can further transmit information related to transmission of power. The information related to transmission of power includes information of resonance frequency in each power transmission slot (information of carrier frequency for transmitting power), but is not limited thereto. The power receiving apparatus 200 can receive the power in the allocated power transmission slot by having the power transmitting apparatus 100 notify each power receiving apparatus 200 the information related to transmission of power such as information of resonance frequency.

When the communication unit 102 receives the power transmission request, the communication control unit 120 causes the communication unit 102 to transmit the start notification to start deriving the coupling coefficient κ to the power receiving apparatus 200 that transmitted the power transmission request.

Furthermore, when the communication unit 102 receives various information transmitted from the power receiving apparatus 200, the communication control unit 120 transmits the relevant information to each unit that uses the information according to the type of information. For instance, when the communication unit 102 receives the power consumption information Prcv, the communication control unit 120 transmits the power consumption information Prcv to the transmission power information deriving unit 122, or when the communication unit 102 receives the received power information, the communication control unit 120 transmits the relevant received power information or the information that the received power information is received to the transmission power information deriving unit 122. The communication control unit 120 is not limited to transmitting various information received by the communication unit 102 to each unit and may record the information in the storage unit 108.

The transmission power information deriving unit 122 has a role of deriving information related to power transmission for defining the state related to transmission of power between the power transmitting apparatus 100 and the power receiving apparatus 200. More specifically, the transmission power information deriving unit 122 transmits the first transmission power Ptrans(k) for deriving the information related to power transmission from the power transmission unit 104. The transmission power information deriving unit 122 transmits the first transmission power Ptrans(k) that increases discretely from the initial value (e.g., k=0) to the maximum value. For instance, the transmission power information deriving unit 122 can transmit a discrete first transmission power Ptrans(k) using a look up table in which the value of k and the value of the first transmission power Ptrans(k) are corresponded, but is not limited thereto. The information such as the look up table used by the transmission power information deriving unit 122 to transmit the first transmission power Ptrans(k) may be stored in a storing means (e.g., non-volatile memory such as EEPROM and flash memory) arranged in the transmission power information deriving unit 122, but is not limited thereto, and may be stored in the storage unit 108 of the power transmitting apparatus 100.

The transmission power information deriving unit 122 derives the information related to power transmission based on the first power consumption information Prcv acquired from each of the power receiving apparatuses 200 and the first transmission power Ptrans(k) of when receiving the received power information. The transmission power information deriving unit 122 can derive the coupling coefficient κ serving as the information related to power transmission by using Formula 1, but it not limited thereto. For instance, the transmission power information deriving unit 122 can uniquely derive the coupling coefficient κ serving as the information related to power transmission using the look up table in which the first power consumption information Prcv, the first transmission power Ptrans(k), and the coupling coefficient κ are corresponded.

Furthermore, the transmission power information deriving unit 122 can record the derived information related to power transmission in the storage unit 108. The transmission power information deriving unit 122 may cause the power transmission control unit 126 to transmit the first transmission power Ptrans(k) by issuing a transmission command to the power transmission control unit 126.

The power transmission slot allocating unit 124 has a role of performing the process of (1) of the power transmission approaches described above. More specifically, the power transmission slot allocating unit 124, for example, allocates one or more power receiving apparatus 200 to each power transmission slot based on the power transmission request transmitted from the power receiving apparatus 200. The power transmitting apparatus 100 generates or updates the power transmission table as shown in FIG. 6 and the like based on the allocation result.

The power transmission slot allocating unit 124 transmits the notification that the power transmission table is updated to the communication control unit 120. It should be recognized that the power transmission slot allocating unit 124 can transmit the allocation result itself to the communication control unit 120.

The power transmission control unit 126 has a role of controlling the power transmission unit 104. The power transmission control unit 126 reads out the power transmission table stored in the storage unit 108, and transmits the power for every power transmission slot of each power transmission frame based on the read power transmission table. If the power transmission slot allocating unit 124 is configured to update the power transmission table (configured such that the power transmission table is not generated for every power transmission frame), the power transmission slot allocating unit 124 and the power transmission control unit 126 can perform the process in cooperation with each other. The power transmission control unit 126 may also cause the power transmission unit 104 to transmit the first transmission power Ptrans(k), in which the power to transmit increases discretely based on the transmission instruction from the transmission power information deriving unit 122.

The control unit 106 can perform communication control and power transmission control with the power receiving apparatus 200 by including the communication control unit 120, the transmission power information deriving unit 122, the power transmission slot allocating unit 124, and the power transmission control unit 126

The storage unit 108 is a storing means arranged in the power transmitting apparatus 100. The storage unit 108 stores the power transmission table, the power consumption information Prcv transmitted from each power receiving apparatus 200, the coupling coefficient κ (one example of information related to power transmission) of each power receiving apparatus 200 derived by the transmission power information deriving unit 122, various applications, and the like. In FIG. 7, an example where the power transmission table 130 is stored in the storage unit 108 is shown.

The storage unit 108 may be a magnetic recording medium such as hard disc, a non-volatile memory such as flash memory, and the like, but is not limited thereto.

The operation unit 110 is an operating means of the power transmitting apparatus 100 enabling the user to perform a predetermined operation. The power transmitting apparatus 100 can perform the operation desired by the user by arranging the operation unit 110 in the power transmitting apparatus 100. The operation unit 110 may be an operation input device such as keyboard and mouse, button, direction key, rotary selector such as jog dial, or a combination thereof, but is not limited thereto.

The display unit 112 is a displaying means arranged in the power transmitting apparatus 100 and displays various information on the display screen. The screen displayed on the display screen of the display unit 112 may be an operation screen for causing the power transmitting apparatus 100 to perform the desired operation, a screen showing the state of communication, state of power transmission, and the like with the power receiving apparatus 200, but is not limited thereto. The display unit 112 may be an LCD, an organic EL display, and the like, but is not limited thereto.

The power transmitting apparatus 100 can stably transmit power to one or more power receiving apparatus 200 according to the above configuration. The power transmission method in the power transmitting apparatus 100 will bow be specifically described.

[Power Transmission Method in Power Transmitting Apparatus 100]

Figure 13:
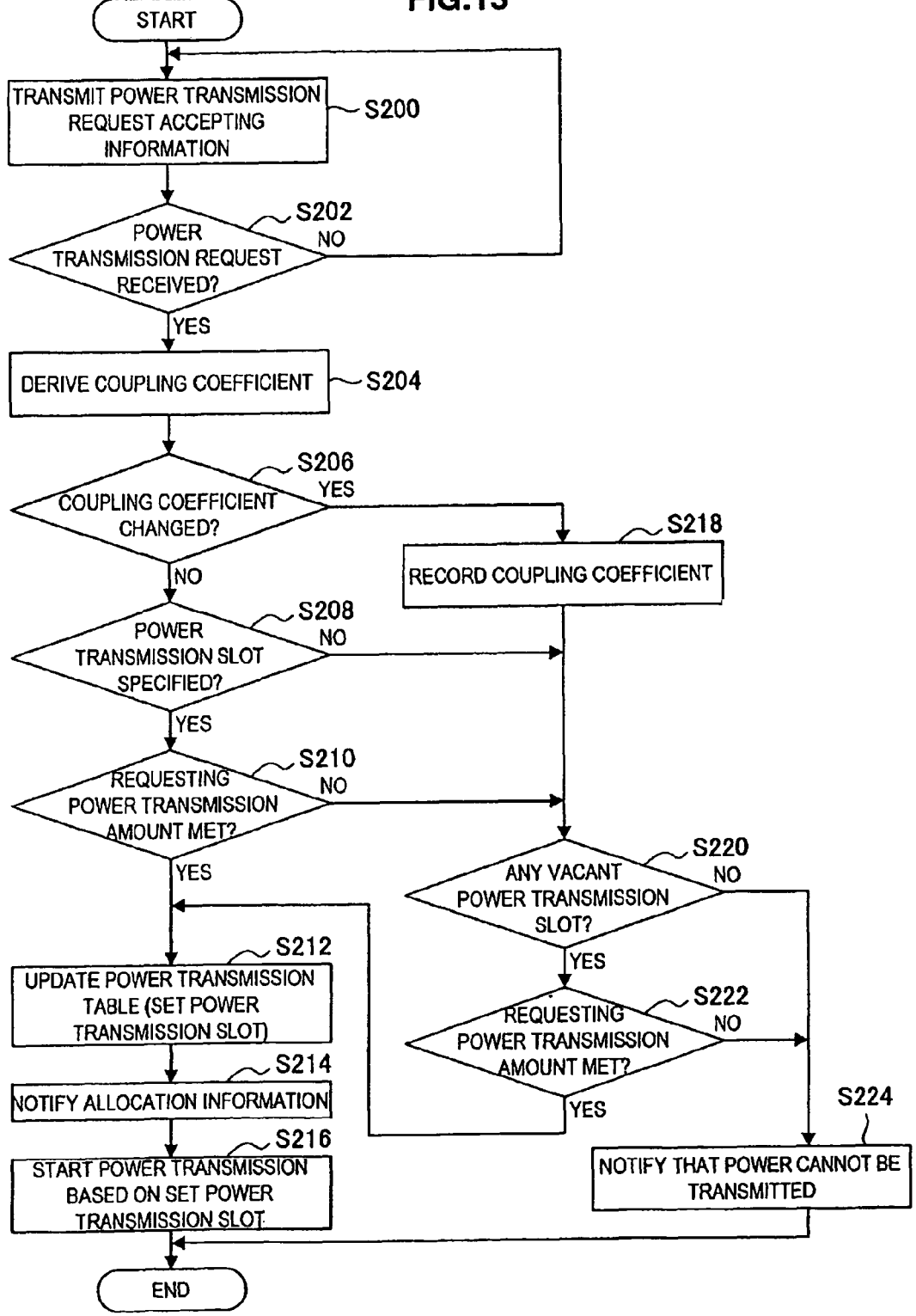
FIG. 13 is a flowchart showing one example of the power transmission method in the power transmitting apparatus according to the embodiment of the present invention.

FIG. 13 is a flowchart showing one example of the power transmission method in the power transmitting apparatus 100 according to the embodiment of the present invention. FIG. 13 shows a case where the power transmitting apparatus 100 derives the coupling coefficient κ as information related to power transmission.

The power transmitting apparatus 100 transmits the power transmission request accepting information (S200). The power transmitting apparatus 100 can transmit the power transmission request accepting information in the last power transmission slot of the power transmission frame as shown in FIG. 3, but is not limited thereto.

After transmitting the power transmission request accepting information in step S200, the power transmitting apparatus 100 determines whether or not the power transmission request transmitted from the power receiving apparatus 200 is received (S202). If determined that the power transmission request is not received within a predetermined waiting period, for example, in step S202, the power transmitting apparatus 100 repeats the process from step S200.

If determined that the power transmission request is received in step S202, the power transmitting apparatus 100 derives the coupling coefficient κ (one example of information related to power transmission) with the power receiving apparatus 200 corresponding to the relevant power transmission request (S204). The power transmitting apparatus 100 can derive the coupling coefficient κ with the power receiving apparatus 200 corresponding to the power transmission request by using the method shown in FIG. 4.

After deriving the coupling coefficient κ with the power receiving apparatus 200 corresponding to the power transmission request in step S204, the power transmitting apparatus 100 determines whether or not the coupling coefficient κ with the power receiving apparatus 200, which coupling coefficient κ is derived, is changed (S206). The power transmitting apparatus 100 performs the process of step S206 on each power receiving apparatus 200, which coupling coefficient κ is derived in step S204. The power transmitting apparatus 100 may perform the process of step S206 by comparing the value of the coupling coefficient κ stored in the storage unit 108 and the value of the coupling coefficient κ derived in step S204, but is not limited thereto. If the coupling coefficient κ is not stored in the storage unit 108 (if the power transmitting apparatus 100 does not store the coupling coefficient κ), the power transmitting apparatus 100 can determine that the coupling coefficient κ changed.

<1> If Determined that the Coupling Coefficient κ is not Changed

If determined that the coupling coefficient κ is not changed in step S206, the power transmitting apparatus 100 determines whether or not the power transmission slot is specified (S208). In this case, the power transmitting apparatus 100 performs the process of step S208 based on the power transmission slot number information indicating the number of the power transmission slot desiring for power transmission contained in the power transmission request.

If the power transmission slot is not specified in step S208, the power transmitting apparatus 100 determines whether or not there is a vacant power transmission slot (S220). The power transmitting apparatus 100 determines whether or not there is a vacant power transmission slot based on the value of Status Si of each power transmission slot in the power transmission table shown in FIG. 6.

If determined that there is no vacant power transmission slot in step S220, the power transmitting apparatus 100 notifies that power may not be transmitted (power transmission not possible) to the power receiving apparatus 200 corresponding to the determination of step S220 (S224).

If determined that there is a vacant power transmission slot in step S220, the power transmitting apparatus 100 determines whether or not the requesting power transmission amount, which the power receiving apparatus 200 requests for power transmission, can be satisfied (S222). The power transmitting apparatus 100 can perform the determination of step S222 based on the value of the Status Si and the converted power transmission margin Ri of each power transmission slot in the power transmission table shown in FIG. 6, but is not limited thereto.

If determined that the requesting power transmission amount is not satisfied in step S222, the power transmitting apparatus 100 can notify that the power may not be transmitted (power transmission not possible) to the power receiving apparatus 200 corresponding to the determination of step S222 (S224). If determined that the requesting power transmission amount is satisfied in step S222, the power transmitting apparatus 100 updates the power transmission table (S212: power transmission slot setting process).

If determined that the power transmission slot is specified in step S208, the power transmitting apparatus 100 determines whether or not the requesting power transmission amount, which the power receiving apparatus 200 requests for power transmission, can be satisfied (S210), similar to step S222.

If determined that the requesting power transmission amount is satisfied in step S210, the power transmitting apparatus 100 updates the power transmission table (S212). If determined that the requesting power transmission amount is not satisfied in step S210, the power transmitting apparatus 100 performs the processes from step S220 described above.

<2> If Determined that the Coupling Coefficient κ is Changed

If determined that the coupling coefficient κ is changed in step S206, the power transmitting apparatus 100 records (e.g., newly record, overwrite update, etc.) the coupling coefficient κ derived in step S204 (S218). The power transmitting apparatus 100 then performs the processes from step S220 described above.

The power transmitting apparatus 100 performs the process of <1> or <2> based on the coupling coefficient κ derived in step S204 with respect to each power receiving apparatus 200 corresponding to the power transmission request. After performing the process of <1> or <2> with respect to all the power receiving apparatuses 200 corresponding to the power transmission request, the power transmitting apparatus 100 notifies the allocation information to each power receiving apparatus 200 (S214). In this case, the power transmitting apparatus 100 can transmit the allocation information in the last power transmission slot of the power transmission frame as shown in FIG. 3, but is not limited thereto.

After notifying the allocation information to each power receiving apparatus 200 in step S214, the power transmitting apparatus 100 starts power transmission based on the set power transmission slot in the next power transmission frame (S216). The power transmitting apparatus 100 can, for example, perform the process of step S216 based on the power transmission table stored in the storage unit 108.

The power transmitting apparatus 100 can stably transmit power to one or more power receiving apparatus 200 by using the power transmission method shown in FIG. 13.

[Power Receiving Apparatus 200A]

The power receiving apparatus 200A will now be described. The power receiving apparatus 200A includes a communication unit 202 (power reception side communication unit) the power reception unit 204, a transformer/regulator 206, a power supply unit 208, a load circuit 210, a received power level detection unit 212, a switching unit 214, a control unit 216, a storage unit 218, an operation unit 220, and a display unit 222. The power receiving apparatus 200A is not limited to the configuration of FIG. 7, and may adopt a configuration not including the power supply unit 208 (configuration of driving with received power).

The power receiving apparatus 200A may include a ROM (not shown) recorded with programs and control data such as calculation parameter used by the control unit 216; a RAM (not shown) for primary storing programs and the like executed by the control unit 216; and the like. The power receiving apparatus 200A connects each components by a bus serving as a data transmission path.

[Hardware Configuration Example of Power Receiving Apparatus 200A]

Figure 14:
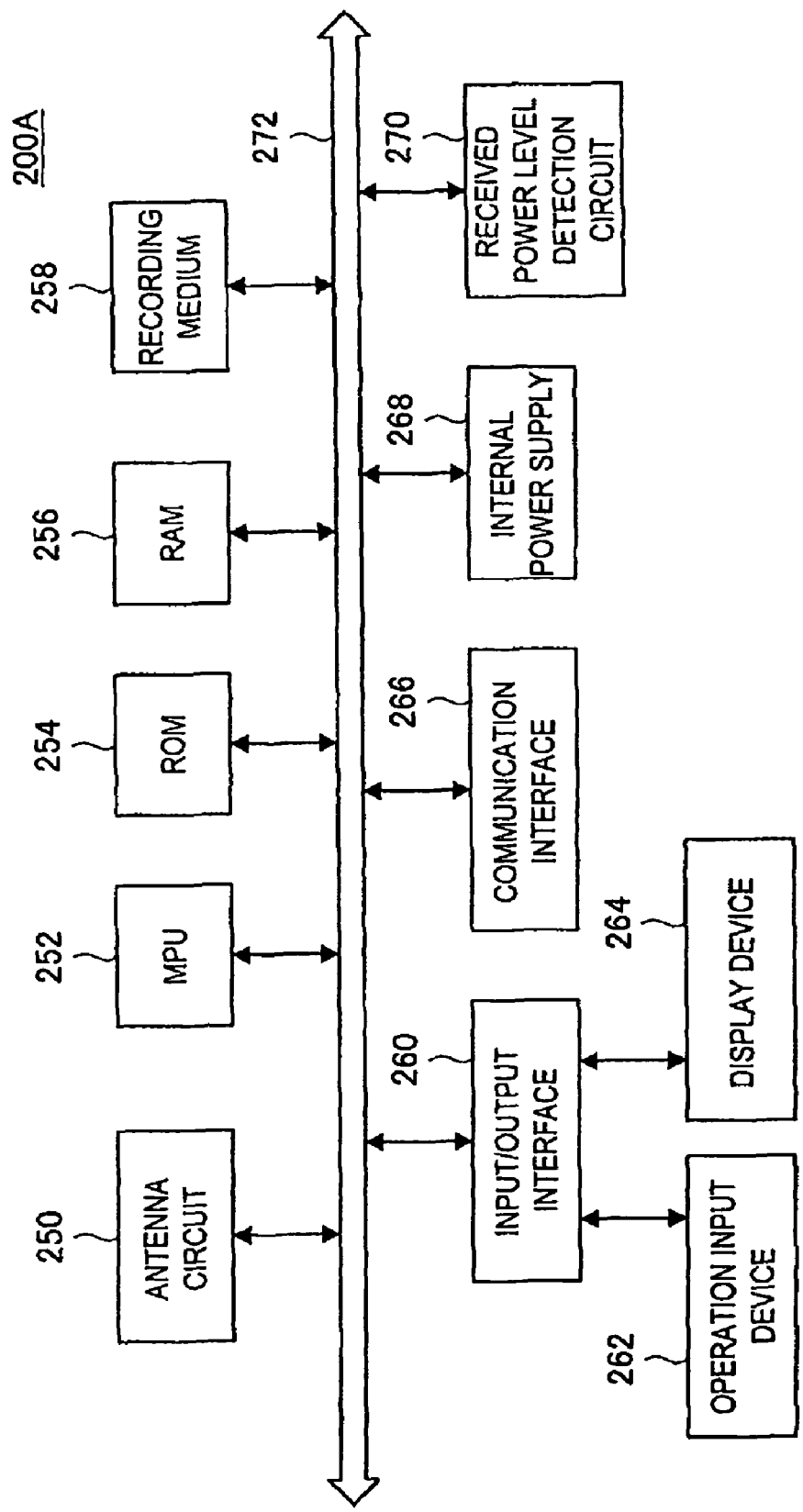
FIG. 14 is an explanatory view showing one example of a hardware configuration of the power receiving apparatus according to the embodiment of the present invention.

FIG. 14 is an explanatory view showing one example of a hardware configuration of the power receiving apparatus 200A according to the embodiment of the present invention. With reference to FIG. 14, the power receiving apparatus 200A includes an antenna circuit 250, an MPU 252, a ROM 254, a RAM 256, a recording medium 258, an input/output interface 260, an operation input device 262, a display device 264, a communication interface 266, an internal power supply 268, and a received power level detection circuit 270. The power receiving apparatus 200A connects each component by a bus 272 serving as a transmission path of data and the like.

The antenna circuit 250 functions as the power transmission 204 in the power receiving apparatus 200A. Thus, the antenna circuit 250 may adopt the configurations corresponding to FIGS. 8 to 11 in correspondence to the power transmitting means in the power transmission unit 104 arranged in the power transmitting apparatus 100.

The MPU 252 functions as the control unit 206 for controlling the entire power receiving apparatus 200A. The ROM 254 stores the programs and the control data such as the calculation parameter used by the MPU 252, and the RAM 256 primary stores the programs, and the like executed by the MPU 252.

The recording medium 258 functions as the storage unit 218, and stores the power consumption information Prcv, the second power consumption information Prcv0, the application, and the like. The recording medium 258 may be a magnetic recording medium such as hard disc, or a non-volatile memory such as EEPROM, flash memory, MRAM, FeRAM, and PRAM, but is not limited thereto.

The input/output interface 260 connects the operation input device 262 and the display device 264. The operation input device 262 functions as the operation unit 220, and the display device 264 functions as the display unit 222. The input/output interface 260 may be a USB terminal, DVI terminal, HDMI terminal, and the like, but is not limited thereto. The operation input device 262 may be a button, a direction key, a rotary selector such as a jog dial, or a combination thereof, and is arranged on the power receiving apparatus 200A and connected to the input/output interface 260 at the interior of the power receiving apparatus 200A. The display device 264 may be an LCD, organic EL display, and the like, and is arranged on the power receiving apparatus 200A and connected to the input/output interface 260 at the interior of the power receiving apparatus 200A. It should be recognized that the input/output interface 260 can be connected to an operation input device (e.g., keyboard and mouse) serving as an external device of the power receiving apparatus 200A, and a display device (e.g, external display).

The communication interface 266 is a communication means arranged in the power receiving apparatus 200A, and function as a communication unit 202 for wireless/wire communicating with the external device such as the power transmitting apparatus 100. The communication interface 266 here may be a communication antenna and RF circuit (wireless communication), IEEE 802.15.1 port and transmission/reception circuit (wireless communication), IEEE 802.11b port and transmission/reception circuit (wireless communication), LAN terminal and transmission/reception circuit (wire communication), or the like, but is not limited thereto.

The internal power supply 268 is a power supply arranged in the power receiving apparatus 200A that stores the received power, and supplies the drive voltage for driving each unit of the power receiving apparatus 200A. The internal power supply 268 may be a rechargeable battery such as lithium-ion rechargeable battery, but is not limited thereto.

The received power level detection circuit 270 functions as the received power level detection unit 212, and outputs the detection result corresponding to the received power level of the received first transmission power Ptrans(k).

<Example of Received Power Level Detection Circuit 270>

(1) FIRST EXAMPLE

Figure 15:
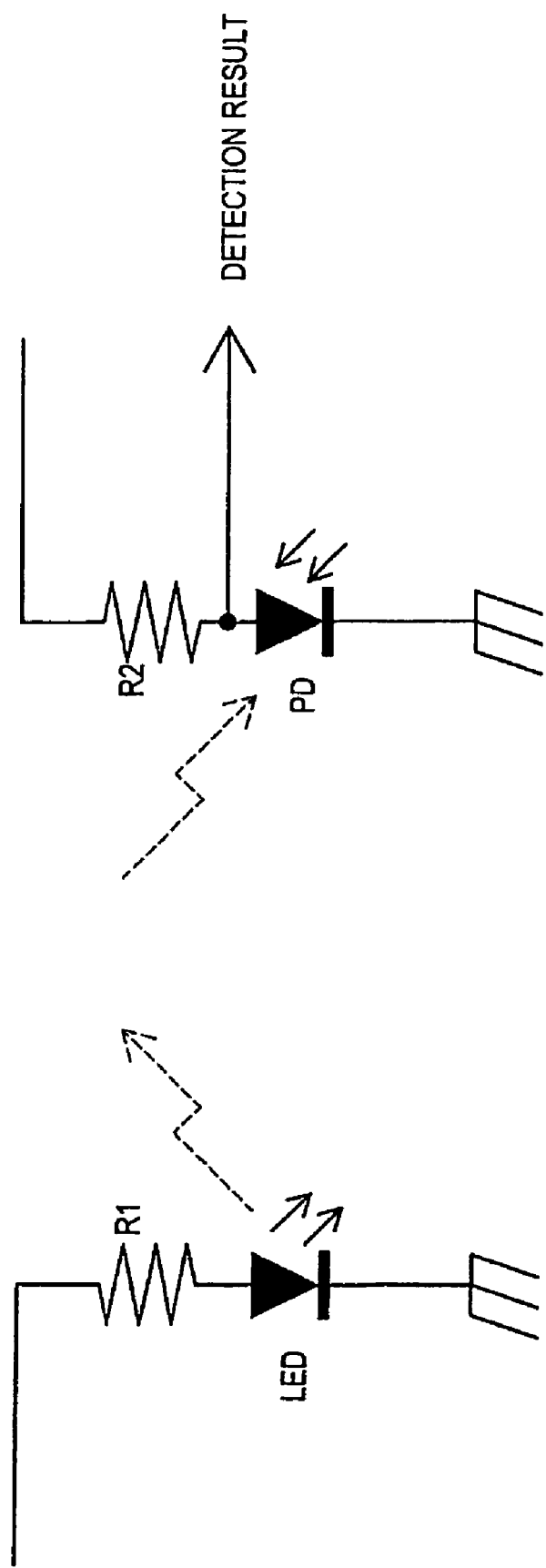
FIG. 15 is an explanatory view showing a first example of the received power level detection circuit according to the embodiment of the present invention.

FIG. 15 is an explanatory view showing a first example of the received power level detection circuit 270 according to the embodiment of the present invention. With reference to FIG. 15, a received power level detection circuit 270A according to the first example includes a resistor R1, a light emission diode LED, a photodiode PD, and a resistor R2. When the load current corresponding to the first transmission power Ptrans (k) flows to the light emission diode LED, the light emission diode LED emits light at a light emission amount corresponding to such load current. The photodiode PD acts as a so-called photodetector, and detects the light generated by the light emission diode LED. The photodiode PD outputs the current corresponding to the detection amount. The received power level detection circuit 270A outputs the detection result corresponding to the received power level of the received first transmission power Ptrans(k) by outputting the current corresponding to the detection amount as detection result.

The resistor R1 and the light emission diode LED shown in FIG. 15 correspond to a measurement load circuit for deriving the information related to power transmission. The photodiode PD and the resistor R2 shown in FIG. 15 correspond to a detection circuit. In FIG. 15, the received power level detection circuit 270A includes the photodiode PD, but is not limited thereto. The received power level detection circuit according to the embodiment of the present invention may be configured using various photodetectors such as photoresistor.

(2) SECOND EXAMPLE

Figure 16:
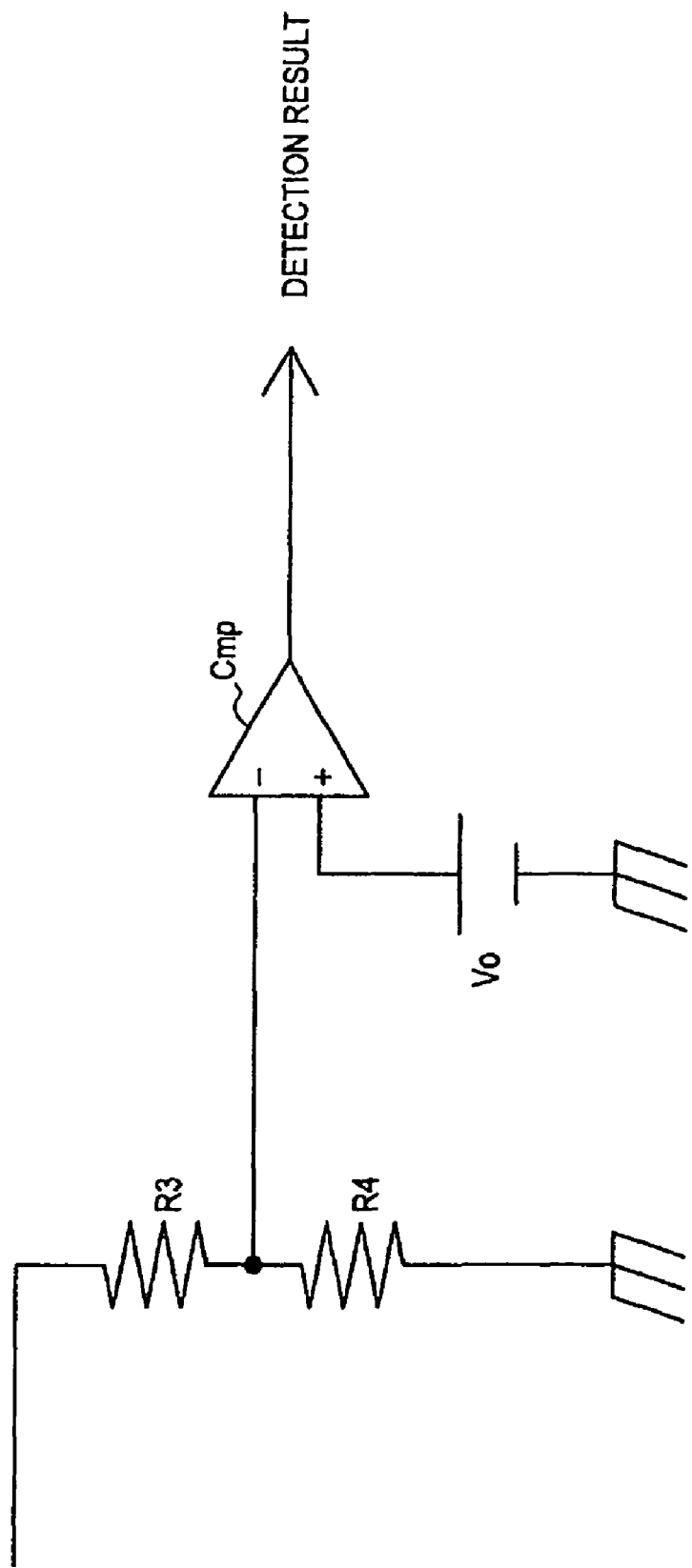
FIG. 16 is an explanatory view showing a second example of the received power level detection circuit according to the embodiment of the present invention.

FIG. 16 is an explanatory view showing a second example of a received power level detection circuit 270 according to the embodiment of the present invention. With reference to FIG. 16, a received power level detection circuit 270B according to the second example includes a resistor R3, a resistor R4, and a comparator Cmp. The resistor R3 and the resistor R4 voltage divides the voltage corresponding to the first transmission power Ptrans(k), and the comparator Cmp compares the voltage divided voltage and a reference voltage V0. The comparator Cmp outputs the voltage corresponding to the comparison result as detection result. Therefore, the received power level detection circuit 270B outputs the detection result indicating whether or not the received power level of the received first transmission power Ptrans(k) meets a predetermined level.

The resistor R3 and the resistor R4 shown in FIG. 16 correspond to the measurement load circuit for deriving the information related to power transmission. The comparator Cmp shown in FIG. 16 corresponds to the detection circuit. In FIG. 16, the resistor R3 and the resistor R4 are shown as resistors with fixed resistance values, but are not limited thereto, and the resistor R3 and/or the resistor R4 may be variable resistors. The received power level detection circuit 270C can vary the predetermined level indicated by the detection result by having the resistor R3 and/or the resistor R4 as variable resistors.

(3) THIRD EXAMPLE

Figure 17:
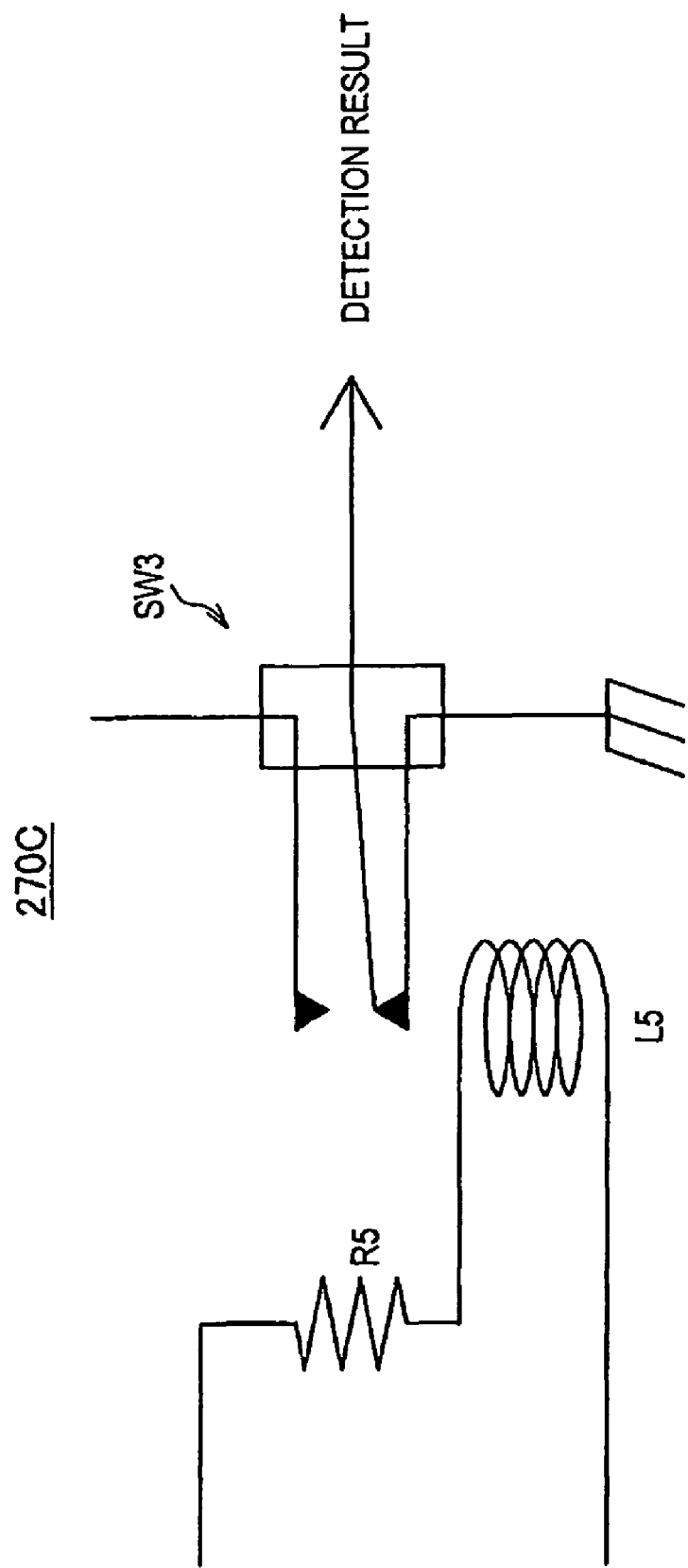
FIG. 17 is an explanatory view showing a third example of the received power level detection circuit according to the embodiment of the present invention.

FIG. 17 is an explanatory view showing a third example of the received power level detection circuit 270 according to the embodiment of the present invention. With reference to FIG. 17, a received power level detection circuit 270C according to the third example includes a resistor R5, an inductor L5, and a switch SW3, and configures an electromagnetic relay switch. When the load current corresponding to the first transmission power Ptrans(k) flows to the inductor L5, the magnetic field according to the load current generates. As the switch SW3 performs the switching operation according to the intensity of the magnetic field based on the load current, the detection result output from the received power level detection circuit 270C changes. Therefore, the received power level detection circuit 270C can output the detection result corresponding to the received power level of the received first transmission power Ptrans(k).

The received power level detection circuit 270 can output the detection result corresponding to the received power level of the received first transmission power Ptrans(k) without measuring the received power value (or voltage value or current value) by adopting the configuration shown in FIGS. 15 to 17.

The power receiving apparatus 200A can configure the power transmission system 1000 in which the power transmitting apparatus 100 can stably transmit power to one or more power receiving apparatus 200 according to the hardware configuration shown in FIG. 14.

The configuration of the power receiving apparatus 200A will be described with reference again to FIG. 7. The communication unit 202 is a communication means arranged in the power receiving apparatus 200, and has a role of wire/wireless communication with the external device such as the power transmitting apparatus 100. The communication unit 202 may adopt a configuration corresponding to the communication unit 102 of the power transmitting apparatus 100. Therefore, the communication unit 202 can receive the power transmission frame synchronization signal S1, the power transmission slot synchronization signal S2, the allocation information S3, and the power transmission request accepting information S4 shown in FIG. 3 and the start notification to start deriving the coupling coefficient κ transmitted from the power transmitting apparatus 100. The communication unit 202 can also transmit the received power information indicating that the received power level meet the predetermined level to the power transmitting apparatus 100. The communication unit 202 has its communication controlled by the control unit 216.

The power reception unit 204 is a power receiving means arranged in the power receiving apparatus 200A, and has a role of receiving the power transmitted in a non-contact manner (wireless) from the power transmitting apparatus 100. The power reception unit 204 may adopt a configuration corresponding to the power transmission unit 104 of the power transmitting apparatus 100, to thereby receive power using electromagnetic induction (first transmitting means), electric wave (second transmitting means), and electric field or magnetic field resonance (third transmitting means, fourth transmitting means).

Although not shown in FIG. 7, the power receiving apparatus 200A can change the resonance frequency related to the reception of power based on the adjustment signal transmitted from the control unit 216. Here, the adjustment signal is selectively transmitted from the control unit 216 based on the information of the resonance frequency (one example of information related to transmission of power) in each power transmission slot received by the communication unit 202. According to such configuration, the power receiving apparatus 200A can receive power in the allocated power transmission slot. A method for the power reception unit 204 to change the resonance frequency includes changing the electrostatic capacity and/or the inductance, but is not limited thereto.

The transformer/regulator 206 performs transformation of voltage based on the power received by the power reception unit 204, smoothing of voltage after transformation, and constant voltage control.

The power supply unit 208 is an internal power supply arranged in the power receiving apparatus 200A and stores the received power. The power supply unit 208 supplies the drive voltage for driving each unit of the power receiving apparatus 200A. The internal power supply 208 may be a lithium-ion rechargeable battery, and the like. As described above, the power receiving apparatus 200 according to the embodiment of the present invention may adopt a configuration of not including the power supply unit 208, that is, a configuration of being driven by directly using the received power.

The load circuit 210 corresponds to a processing circuit, which can be driven by directly using the received power, arranged in the power receiving apparatus 200A. Although not shown in FIG. 7, the load circuit 210 can cause the communication unit 202 to transmit the processing result to the external device or transmit the processing result to the control unit 216.

The received power level detection unit 212 output s the detection result corresponding to the received power level of the received power by adopting the configuration shown in FIGS. 15 to 17. The power receiving apparatus 200A selectively inputs the first transmission power Ptrans(k) to the received power level detection unit 212 by controlling the switching unit 214. Therefore, the received power level detection unit 212 can output the detection result corresponding to the received power level of the received first transmission power Ptrans(k).

The switching unit 214 includes a switch SW1 corresponding to the load circuit 210, and a switch SW2 corresponding to the received power level detection unit 212. The switching unit 214 connects either the load circuit 210 or the received power level detection unit 212 to the power reception unit 204 (more specifically, to the transformer/regulator 206) in response to the control signal transmitted from the control unit 216. For instance, the switching unit 214 connects the load circuit 210 to the power reception unit 204 if the control signal is not transmitted, and connects the received power level detection unit 212 to the power reception unit 204 if the control signal is transmitted. The switch SW1 and the switch SW2 may be configured as a MOSFET (Metal Oxide Semiconductor Field Effect Transistor) in which the conductivity-type differs from each other, but is not limited thereto. The control signal is transmitted from the control unit 216 when the communication unit 202 receives the "start notification".

The power receiving apparatus 200A can transition (switch) from the normal operation mode (state in which the function of the power receiving apparatus 200A can be executed) to the received power level detection mode (state for detecting the received power level) 2 by including the switching unit 214. The power receiving apparatus 200A can also transition from the received power level detection mode to the normal operation mode by including the switching unit 214.

The control unit 216 is configured by MPU and the like, and has a role of controlling the entire power receiving apparatus 200A and a role of performing various processes. When the communication unit 202 receives the "start notification", the control unit 216 transmits the control signal to the switching unit 214. The control unit 216 then can control the power receiving apparatus 200A to transition (switch) from the normal operation mode (state capable of executing the function of the power receiving apparatus 200A) to the received power level detection mode (state for detecting the received power level). When switching to the received power level detection mode, the control unit 216, for example, reads the power consumption information Prcv from the storage unit 218, and transmits the power consumption information Prcv from the communication unit 202 to the power transmitting apparatus 100.

Furthermore, the control unit 216 determines whether or not the received power level meets a predetermined level based on the detection result transmitted from the received power level detection unit 212. When determining that the received power level meets the predetermined level, the control unit 216 transmits "received power information" indicating that the received power level meets the predetermined level from the communication unit 202 to the power transmitting apparatus 100.

As described above, the control unit 216 serves as a communication control unit for controlling transmission and reception of various information transmitted and received with the power transmitting apparatus 100.

Furthermore, when the communication unit 202 receives the information of the resonance frequency (one example of information related to transmission of power) in each power transmission slot, the control unit 216 selectively transmits the adjustment signal to the power reception unit 204 based on the information of the resonance frequency. More specifically, the control unit 216 transmits a first adjustment signal for receiving power or a second adjustment signal for not receiving power to the power reception unit 205 in synchronization with each power transmission slot of the power transmission frame to which the information of the resonance frequency corresponds. When the control unit 216 selectively transmits the adjustment signal to the power reception unit 204, the power receiving apparatus 200A can receive power in the allocated power transmission slot.

The storage unit 218 is a storage means arranged in the power receiving apparatus 200A. The storage unit 218 stores the power consumption information Prcv, the drive information indicating whether or not to directly use the received power, various applications, and the like. The storage unit 218 may be a magnetic recording medium such as hard disc, a non-volatile memory such as flash memory, or the like, but is not limited thereto.

The operation unit 220 is an operating means of the power receiving apparatus 200A enabling the user to perform a predetermined operation. The user can perform the desired operation on the power receiving apparatus 200A by arranging the operation unit 220 in the power receiving apparatus 200. The operation unit 220 may be an operation input device such as keyboard and mouse, button, direction key, rotary selector such as jog dial, or a combination thereof, but is not limited thereto.

The display unit 222 is a displaying means arranged in the power receiving apparatus 200A and displays various information on the display screen. The screen displayed on the display screen of the display unit 222 may be an operation screen for performing the desired operation on the power receiving apparatus 200A, a screen showing the state of communication, state of power transmission, and the like with the power transmitting apparatus 100, but is not limited thereto. The display unit 222 may be an LCD, an organic EL display, and the like, but is not limited thereto.

The power receiving apparatus 200A can configure the power transmission system 1000 in which the power transmitting apparatus 100 can stably transmit power to one or more power receiving apparatus 200 according to the above configuration.

As described above, the power transmission system 1000 according to the embodiment of the present invention includes the power transmitting apparatus 100 and one or more power receiving apparatus 200. The power transmitting apparatus 100 transmits power to one or more power receiving apparatus 200, and the power receiving apparatus 200 receives power transmitted from the power transmitting apparatus 100.

The power transmitting apparatus 100 transmits power using the power transmission approach of (1) Setting of dividing period (power transmission slot) and allocation of power receiving apparatus to each dividing period and (2) Transmission of power based on allocation to dividing period (power transmission slot). The power transmitting apparatus 100 performs allocation as shown in (1-1) first allocation example and (1-2) second allocation example in the process of (1), and records the allocation result in the power transmission table. The power transmitting apparatus 100 selectively transmits power in each power transmission slot of the power transmission frame based on the power transmission table. Therefore, the power transmitting apparatus 100 can lower the possibility of various drawbacks such as each power receiving apparatus 200 receiving the power may not obtain the power necessary for operation.

Therefore, in the power transmission system 1000, power can be stably transmitted to one or more power receiving apparatus 200.

The power transmitting apparatus 100 has been described as a component configuring the power transmission system 1000 according to the embodiment of the present invention, but the embodiment of the present invention is not limited to such embodiment. The embodiment of the present invention may be applied to various apparatuses including a computer such as PC (Personal Computer) and server, disc reproducing device such as Blu-ray (registered trademark) disc reproducer, disc recording/reproducing device such as Blu-ray (registered trademark) recorder and DVD recorder, and game machine such as PlayStation (registered trademark) series.

The power receiving apparatus 200 has been described as a component configuring the power transmission system 1000 according to the embodiment of the present invention, but the embodiment of the present invention is not limited to such embodiment. The embodiment of the present invention may be applied various apparatuses including a computer such as PC, mobile communication device such as mobile telephone and PHS (Personal Handyphone System), video/music reproducing device such as WALK MAN (registered trademark), imaging device such as digital still camera and digital video camera, and mobile game machines such as PlayStation Portable (registered trademark).

(Program Related to Power Transmission System 1000)

The power can be transmitted using the power transmission approach of (1) Setting of dividing period (power transmission slot) and allocation of power receiving apparatus to each dividing period and (2) Transmission of power based on allocation to dividing period (power transmission slot) according to the program for causing the computer to function as the power transmitting apparatus 100 according to the embodiment of the present invention.

The power transmission system 1000 in which power can be stably transmitted to one or more power receiving apparatus 200 can be realized according to the program for causing the computer to function as the power transmitting apparatus 100 according to the embodiment of the present invention.

The present application contains subject matter related to that disclosed in Japanese Priority Patent Application JP 2008-117303 filed in the Japan Patent Office on Apr. 28, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

For instance, the power transmitting apparatus 100 for transmitting power and the power receiving apparatus 200 for receiving power have been respectively described above, but the embodiment of the present invention is not limited to such configuration. The power transmitting apparatus and the power receiving apparatus according to the embodiment of the present invention may respectively be a power transmitting/receiving device having a power transmitting function related to power transmitting apparatus 100 and the power receiving function related to power receiving apparatus 200. Effects similar to the power transmission system 1000 described above are derived even when the power transmission system according to the embodiment of the present invention is configured with the power transmitting/receiving device.

The provision of the program (computer program) for causing the computer to function as the power transmitting apparatus 100 or the power receiving apparatus 200 according to the embodiment of the present invention has been described, but the embodiment of the present invention also provides a storage medium stored with such program.

The above-described configuration shows one example of the embodiment of the present invention, and it should be recognized that it also falls within the technical scope of the present invention.

What is claimed is:

1. A power transmitting apparatus comprising:
   a power transmission side communication unit for communicating with one or more power receiving apparatus for receiving transmitted power in a non-contact manner;
   a power transmission unit for transmitting power to the one or more power receiving apparatus in a non-contact manner;
   an allocating unit for dividing transmission of power from the power transmission unit to the power receiving apparatus to a plurality of dividing periods for every predetermined period, and allocating the one or more power receiving apparatus to one of the dividing periods; and
   a power transmission control unit for selectively transmitting power to the one or more power receiving apparatus in a non-contact manner for every dividing period based on the allocation result in the allocating unit.

2. The power transmitting apparatus according to claim 1, wherein the allocating unit allocates the power receiving apparatus to the dividing period based on a power transmission request desiring for power transmission transmitted from each power receiving apparatus received by the power transmission side communication unit.

3. The power transmitting apparatus according to claim 2, further comprising
a transmission power information deriving unit for increasing discretely a first transmission power to transmit from the power transmission unit to the power receiving apparatus, which transmitted the power transmission request, and deriving, for every power receiving apparatus, information related to power transmission defining a state related to transmission of power with the power receiving apparatus based on reception at the power transmission side communication unit of received power information transmitted from the power receiving apparatus, indicating that a received power level meet a predetermined level, wherein
the allocating unit allocates the power receiving apparatus to the dividing period based on information related to power transmission for every power receiving apparatus derived by the transmission power information deriving unit.

4. The power transmitting apparatus according to claim 3, wherein the transmission power information deriving unit derives a coupling coefficient with the power receiving apparatus as information related to power transmission.

5. The power transmitting apparatus according to claim 4, wherein the allocating unit allocates the power receiving apparatus, which value of the coupling coefficient is within a predetermined range, to the same dividing period.

6. The power transmitting apparatus according to claim 2, wherein the allocating unit allocates the power receiving apparatus to the dividing period based on a total power transmission amount transmittable for every dividing period, and a requesting power transmission amount which transmission is requested by the power receiving apparatus.

7. The power transmitting apparatus according to claim 2, wherein
the power transmission request further includes drive information indicating whether or not to directly use the received power; and
the allocating unit allocates the power receiving apparatus in the dividing period further based on the drive information.

8. The power transmitting apparatus according to claim 2, wherein the power transmission side communication unit transmits power transmission request accepting information requesting for transmission of the power transmission request in one of the dividing periods within the predetermined period.

9. The power transmitting apparatus according to claim 1, wherein the power transmission side communication unit transmits information of the allocation result in the allocating unit to the one or more power receiving apparatus.

10. A power transmission method comprising the steps of:
transmitting power transmission request accepting information requesting for transmission of a power transmission request desiring for power transmission to one or more power receiving apparatus;
receiving the power transmission request transmitted from the power receiving apparatus in response to the power transmission request accepting information;
dividing the transmission of power to a plurality of dividing periods for every predetermined period, and allocating the power receiving apparatus to one of the dividing periods based on the power transmission request received in the receiving step; and
selectively transmitting power to the one or more power receiving apparatus in a non-contact manner for every dividing period based on the allocation result in the allocating step.

11. A non-transitory computer-readable medium comprising a program for causing a computer to execute the steps of:
transmitting power transmission request accepting information requesting for transmission of a power transmission request desiring for power transmission to one or more power receiving apparatus;
receiving the power transmission request transmitted from the power receiving apparatus in response to the power transmission request accepting information;
dividing the transmission of power to a plurality of dividing periods for every predetermined period, and allocating the power receiving apparatus to one of the dividing periods based on the power transmission request received in the receiving step; and
selectively transmitting power to the one or more power receiving apparatus in a non-contact manner for every dividing period based on the allocation result in the allocating step.

12. A power transmission system comprising:
a power transmitting apparatus for transmitting power; and
one or more power receiving apparatus for receiving power transmitted by the power transmitting apparatus, wherein
the power transmitting apparatus includes,
a power transmission side communication unit for communicating with the power receiving apparatus,
a power transmission unit for transmitting power to the one or more power receiving apparatus in a non-contact manner,
an allocating unit for dividing transmission of power from the power transmission unit to the power receiving apparatus to a plurality of dividing periods for every predetermined period, and allocating the power receiving apparatus to the dividing period based on a power transmission request desiring for power transmission transmitted from each power receiving apparatus received by the power transmission side communication unit, and
a power transmission control unit for selectively transmitting power to the one or more power receiving apparatus for every dividing period based on the allocation result in the allocating unit; and
the power receiving apparatus includes,
a power receiving side communication unit for communicating with the power transmitting apparatus,
a power reception unit for receiving power transmitted from the power transmitting apparatus in a non-contact manner, and
a control unit for transmitting the power transmission request to the power transmitting apparatus via the power receiving side communication unit.

13. The power transmitting apparatus according to claim 1, wherein transmitting power in a non-contact manner is selected from transmitting power using electromagnetic induction, transmitting power using an electric wave, transmitting power using an electric field, and transmitting power using magnetic field resonance.

14. A power transmitting apparatus comprising:
a power transmission side communication unit for communicating with one or more power receiving apparatus for receiving transmitted power;

a power transmission unit for transmitting power to the one or more power receiving apparatus in a non-contact manner;

an allocating unit for dividing transmission of power from the power transmission unit to the power receiving apparatus to a plurality of dividing periods for every predetermined period, and allocating the one or more power receiving apparatus to one of the dividing periods; and a power transmission control unit for selectively transmitting power to the one or more power receiving apparatus for every dividing period based on the allocation result in the allocating unit, wherein the allocating unit allocates the power receiving apparatus to the dividing period based on a power transmission request desiring for power transmission transmitted from each power receiving apparatus received by the power transmission side communication unit, wherein the power transmission request further includes drive information indicating whether or not to directly use the received power; and wherein the allocating unit allocates the power receiving apparatus in the dividing period further based on the drive information.

15. The power transmitting apparatus according to claim 14, further comprising a transmission power information deriving unit for increasing discretely a first transmission power to transmit from the power transmission unit to the power receiving apparatus, which transmitted the power transmission request, and deriving, for every power receiving apparatus, information related to power transmission defining a state related to transmission of power with the power receiving apparatus based on reception at the power transmission side communication unit of received power information transmitted from the power receiving apparatus, indicating that a received power level meet a predetermined level, wherein the allocating unit allocates the power receiving apparatus to the dividing period based on information related to power transmission for every power receiving apparatus derived by the transmission power information deriving unit.

16. The power transmitting apparatus according to claim 15, wherein the transmission power information deriving unit derives a coupling coefficient with the power receiving apparatus as information related to power transmission.

17. The power transmitting apparatus according to claim 16, wherein the allocating unit allocates the power receiving apparatus, which value of the coupling coefficient is within a predetermined range, to the same dividing period.

18. The power transmitting apparatus according to claim 14, wherein the allocating unit allocates the power receiving apparatus to the dividing period based on a total power transmission amount transmittable for every dividing period, and a requesting power transmission amount which transmission is requested by the power receiving apparatus.

19. The power transmitting apparatus according to claim 14, wherein the power transmission side communication unit transmits power transmission request accepting information requesting for transmission of the power transmission request in one of the dividing periods within the predetermined period.

* * * * *